(12) United States Patent
Suzuki

(10) Patent No.: US 7,373,375 B2
(45) Date of Patent: May 13, 2008

(54) INFORMATION MANAGEMENT SYSTEM USING AGENTS

(75) Inventor: Satoshi Suzuki, Tokyo (JP)

(73) Assignee: Sony Corporation (JP)

( * ) Notice: Subject to any disclaimer, the term of this patent is extended or adjusted under 35 U.S.C. 154(b) by 793 days.

(21) Appl. No.: 10/130,781

(22) PCT Filed: Oct. 1, 2001

(86) PCT No.: PCT/JP01/08655

§ 371 (c)(1),
(2), (4) Date: Sep. 23, 2002

(87) PCT Pub. No.: WO02/27592

PCT Pub. Date: Apr. 4, 2002

(65) Prior Publication Data

US 2003/0115254 A1    Jun. 19, 2003

(30) Foreign Application Priority Data

Sep. 29, 2000    (JP)    .............................. 2000-301176

(51) Int. Cl.
  G06F 15/16    (2006.01)
  H04Q 7/20    (2006.01)
  G01C 21/00    (2006.01)
(52) U.S. Cl. ...................................... 709/202; 709/245
(58) Field of Classification Search ................ 709/202, 709/219, 245; 716/763; 455/457
See application file for complete search history.

(56) References Cited

U.S. PATENT DOCUMENTS 5,893,096 A * 4/1999 Nakamura .................... 707/10

(Continued)

FOREIGN PATENT DOCUMENTS

EP    97122454    12/1997

(Continued)

OTHER PUBLICATIONS

Hiroyuki Tarumi, Ken Morishita, Yusuke Ito, Yahiko Kambayashi, Communication through virtual active objects overlaid onto the real world, Proceedings of the third international conference on Collaborative virtual environments, p. 155-164, Sep. 2000, San Francisco, California, United States.*

(Continued)

Primary Examiner—Glenton B. Burgess
Assistant Examiner—Philip J Chea
(74) Attorney, Agent, or Firm—Lerner, David, Littenberg, Krumholz & Mentlik, LLP

(57) ABSTRACT

An agent employment system comprising at least one data terminal and at least one server computer. The data terminal is connected to a communications network and having a display device. The sever computer is connected to the data terminal by the communications network and having a community (67) for storing an agent (63). The server computer has agent-transmitting means for transmitting the agent (63) to the data terminal at a first timing. The data terminal has agent-receiving means for receiving the agent (63) transmitted from the server computer and second agent-transmitting means for transmitting the agent 63 back to the server computer at a second timing. Thus, the invention can provide a novel information management system, agent employment system, information management method, agent employment method, data-providing apparatus and data-recording medium, in which a user can easily obtain an electronic pet that acts as an agent satisfying desired conditions.

27 Claims, 22 Drawing Sheets

U.S. PATENT DOCUMENTS

| | | | | |
|---|---|---|---|---|
| 5,956,697 | A * | 9/1999 | Usui | 705/32 |
| 6,085,240 | A * | 7/2000 | Suzuki et al. | 709/223 |
| 6,119,101 | A | 9/2000 | Peckover | |
| 6,134,580 | A * | 10/2000 | Tahara et al. | 709/202 |
| 6,181,692 | B1 * | 1/2001 | DeGolia, Jr. | 370/352 |
| 6,195,678 | B1 * | 2/2001 | Komuro | 709/202 |
| 6,199,077 | B1 * | 3/2001 | Inala et al. | 715/501.1 |
| 6,199,097 | B1 * | 3/2001 | Hachiya et al. | 709/202 |
| 6,240,405 | B1 * | 5/2001 | Suzuki | 706/45 |
| 6,317,718 | B1 * | 11/2001 | Fano | 705/1 |
| 6,336,137 | B1 * | 1/2002 | Lee et al. | 709/219 |
| 6,604,681 | B1 * | 8/2003 | Burke et al. | 235/383 |
| 6,845,486 | B2 * | 1/2005 | Yamada et al. | 715/706 |
| 2002/0052913 | A1 * | 5/2002 | Yamada et al. | 709/202 |

FOREIGN PATENT DOCUMENTS

| | | |
|---|---|---|
| EP | 00942384 | 6/2000 |
| EP | 00964712 | 10/2000 |
| WO | 99/46712 | 9/1999 |
| WO | 02/01386 | 1/2000 |
| WO | 01/30410 | 6/2000 |
| WO | 01/27771 | 10/2000 |
| WO | 01/67704 | 9/2001 |

OTHER PUBLICATIONS

H. Tarumi, K.Morishita, M.Nakao, and Y.Kambayashi, "SpaceTag: An Overlaid Virtual System and its Application," International Conference on Multimedia Computing and Systems (ICMCS'99), vol. 1, pp. 207-212, 1999.☐☐*

Magendanz et al., "Intelligent Agents: An Emerging Technology for Next Generation Telecommunications?", Proceeding of IEEE Infocom, 2:464-472 (1996).

Anders Kristensen, Formsheets and the XML forms language, Computer Networks 31:1189-1201 (1999).

Pan et al., "I-Views: a community-oriented system for sharing streaming video on the Internet", Computer Networks 33:567-581 (2000).

* cited by examiner

| CREATED ID 111 | PLACE 112 | AGENT 113 | AGE OF AGENT 114 | BIRTHDAY OF CREATURE 115 | BASIC APPEARANCE 116 | EMPLOYABILITY 117 | WAGES 118 | OWNER ID 120 |
|---|---|---|---|---|---|---|---|---|
| A-001 | 85a | 1 | 2 YEARS AND 7 MONTHS | 1998/1/10 | xxx31 | 0 | — | KW5697532 |
| A-002 | 85a | 1 | 3 MONTHS | 1998/1/10 | xxx32 | 1 | AUCTION | UG7810976 |
| A-003 | 85a | 1 | 1 YEARS AND 2 MONTHS | 1998/5/10 | xxx33 | 0 | — | QV5612790 |
| A-004 | 85a | 1 | 6 MONTHS | 1998/5/10 | xxx34 | 1 | ¥7,000 | LY0257895 |
| A-005 | 85a | 0 | — | 1999/1/10 | xxx35 | 0 | — | EG6476321 |
| A-006 | 85a | 1 | 2 MONTHS | 1999/1/10 | xxx36 | 1 | $50 | AA0000001 |
| A-007 | 85a | 0 | — | 1999/1/10 | xxx37 | 0 | — | AA0000001 |
| ... | ... | ... | ... | ... | ... | ... | ... | ... |

| BASIC APPEARANCE 1 | ADDRESS xxx31 |
|---|---|
| BASIC APPEARANCE 2 | ADDRESS xxx32 |
| BASIC APPEARANCE | |
| BASIC APPEARANCE | |
| BASIC APPEARANCE | |
| BASIC APPEARANCE | |
| BASIC APPEARANCE | |
| BASIC APPEARANCE | |

| MOTION 1 | ADDRESS xxx21 |
|---|---|
| MOTION 2 | ADDRESS xxx22 |
| MOTION 3 | |
| MOTION 4 | |
| MOTION 5 | |
| MOTION 6 | |
| MOTION 7 | |
| MOTION 8 | |

| EXPRESSION 1 | ADDRESS xxx11 |
|---|---|
| EXPRESSION 2 | ADDRESS xxx12 |
| EXPRESSION 3 | |
| EXPRESSION 4 | |
| EXPRESSION 5 | |
| EXPRESSION 6 | |
| EXPRESSION 7 | |
| EXPRESSION 8 | |

| EXPRESSION 1 | ADDRESS xxx01 |
|---|---|
| EXPRESSION 2 | ADDRESS xxx02 |
| EXPRESSION 3 | ADDRESS xxx03 |
| EXPRESSION 4 | ADDRESS xxx04 |
| EXPRESSION 5 | ADDRESS xxx05 |
| EXPRESSION 6 | ADDRESS xxx06 |
| EXPRESSION 7 | ADDRESS xxx07 |
| EXPRESSION 8 | ADDRESS xxx08 |

FIG.6

AGENT INTRODUCTION

| NO. | PROGRAM | CHARACTERISTIC | APPEARANCE | PURCHASE |
|---|---|---|---|---|
| B-004 | ENGLISH-TO-JAPANESE TRANSLATION | DETAILS | APPEARANCE | PURCHASE |
| B-007 | JAPANESE/ENGLISH TRANSLATION | DETAILS | APPEARANCE | PURCHASE |
| B-010 | JAPANESE/ENGLISH TRANSLATION | DETAILS | APPEARANCE | PURCHASE |
| B-011 | JAPANESE-TO-GERMAN TRANSLATION | DETAILS | APPEARANCE | PURCHASE |

NEXT PAGE 95a  95b  95c  95d  95e

FIG.15

INFORMATION MANAGEMENT SYSTEM USING AGENTS

CROSS-REFERENCE TO RELATED APPLICATIONS

The present application is a national stage application under 35 U.S.C. § 371 of International Application No. PCT/JP01/08655, filed Oct. 1, 2001, which claims priority from Japanese Application No. P2000-301176, filed Sep. 29, 2000, the disclosures of which are hereby incorporated by reference herein.

BACKGROUND OF THE INVENTION

1. Technical

The present invention relates to an information management system, an agent employment system, an information management method, an agent employment method, a data-providing apparatus and a data-recording medium. In particular, the invention relates to an information management system, an agent employment system, an information management method, an agent employment method, a data-providing apparatus and a data-recording medium, in which agents enable the user to achieve information management by intuition.

2. Background Art

A so-called "agent system" is generally known, in which an agent program, i.e., a computer program, is executed to simulate human relations by performing work for human workers in an on-line scheme.

In the agent system, the agent program remains installed in a computer and functions as an agent of the user. When an event takes places, the agent program is activated to act as is desired in a network. The agent program is an autonomous program that may "talk" with character data displayed on the display screen of the computer or may "acts" as the agent of the user on the network. The agent program work by itself, without any human assistance.

When given a command of "search for this product," for example, the agent automatically causes the computer to have access to the data-providing server of the company that supplies that product. If no data about the product is found in the data-providing server, the agent makes the computer to a server that provides a virtual mall or the like. Thus, the agent moves, as it were, along the communications lines to search for the desired data. A so-called "mobile agent (mobile script writer) is known, too. The mobile agent works while moving along the communications lines.

Another type of an agent system is known in which an agent program is sent to a server computer. In the server computer, the agent program is executed to perform works such as retrieval of information. In this system, any client computer can control the execution of program carried out in the server computer and can receive the results of the execution of program.

The client computer may acquire various application programs from the server computer and may then use the application programs. In this regard, the technique of charging an amount of money for the time the client computer has used the application programs is known.

In the conventional agent system, the user of an agent needs to give any instructions to the agent every time he or she wants the agent to do something. Agents exist in data terminals in the conventional agent system. The user may have a plurality of data terminals (for example, a mobile telephone, a personal computer (PC), a personal digital assistance (PDA) terminal, a game device, and the like). In such a case, the agent system needs to store the data representing which agent has acquired what information. If the information the agent processes is an E-mail or schedule management data, the data terminals must be directly connected to one another in order to synchronize the information among them. The more terminal apparatuses are provided, the more cumbersome it would be to connect them. In addition it is necessary to use a server that has management tools in order to synchronize the information among the terminal apparatuses. To control the management tools in the same manner, however, so-called "exclusive control" must be effected not to update the same information in a plurality of apparatuses, or the information updated in each data terminal must be fed back to the control tools. These operations are hard for the elderly people and children who are unfamiliar to data apparatuses such as computers and mobile telephones. Even young people who are accustomed to the use of computers and mobile telephones cannot instantly understand how to achieve these operations, in the age of "ubiquitous", when every electric apparatuses may be connected to the Internet.

In the age of "ubiquitous", when everybody has a device storing the network addresses of many people, any person cannot quickly understand to which address the information should be transmitted so that the receiver may quickly grasp the contents of the information. Mr. A who wishes to send to Mr. B the pictures he takes on a trip in real time cannot transmit the pictures unless Mr. A does not know which one of the apparatuses the Mr. B is using. To display an agent on the display of any electric apparatus, it should be considered that the data terminals differ in terms of ability (the ability of the CPU used, the capacity of the memory used, and the like).

An agent program may be sent to the server computer and executed in the server computer to retrieve information or to achieve a similar operation. In this case, the user must acquire an agent with a prescribed ability. However, the user can hardly know where such agents are available.

The user does not always need agents having the same ability. At some time, the user may want an agent that has much financial information. At another time, he or she may wish to have an agent that knows much about political situation. At still another time, he or she may need an agent that can give detailed information about plays and games. In short, the user wants agents of various abilities at different times, depending on the nature of his or her work on hand or the type of his or her hobby. However, it is not easy for the user to obtain a desirable agent.

SUMMARY OF THE INVENTION

The present invention has been made in view of the foregoing. It is desirable to provide an information management system, an information management method, an information-managing server computer, and a data-recording medium, in which a user can use agents satisfying desired conditions, thereby to control information by performing operations that can be quickly understood.

It is also desirable to provide a novel information management system, agent employment system, information management method, agent employment method, data-providing apparatus and data-recording medium, in which a user can easily obtain an electronic pet that acts as an agent satisfying desired conditions. It is further desirable to provide a novel information management system, information management method, agent employment system, agent employment method, data-providing apparatus and data-recording medium, in which a user can regularly send an agent, or an electronic pet, to a data terminal, and the agent can perform processes in accordance with the instructions made in the data terminal during a prescribed period, thereby to collect information about the client.

It is still further desirable to provide a novel information management system, agent employment system, information management method, agent employment method, data-providing apparatus and data-recording medium, in which an agent exists in a server computer, while being absent from an data terminal, and autonomously collects with high efficiency in accordance with the data it has acquired in the data terminal. Additionally, it is desirable to provide a novel information management system, information management method, agent employment system, agent employment method, data-providing apparatus and data-recording medium, in which an electronic pet, or an agent, is displayed in the form of a character, enabling the user to enjoy using the electronic pet. An information management system according to this invention comprises at least one data terminal connected to a communications network and having a display device, and a server computer connected to the data terminal by the communications network and having a region for storing an agent. The server computer has transmitting means for transmitting the agent to the data terminal of the user who uses the agent, together with first prescribed information, at a first timing upon receipt of a transmission command for transmitting the agent, and rewriting means for rewriting the first prescribed information to second prescribed information sent from the data terminal. The data terminal has transmitting means for transmitting the agent to the server computer, together with the second prescribed information, at a second timing, upon receipt of the agent from the server computer. In the information management system, the agent is a personified one and enables the user to control and share quickly the information about a person (e.g., schedule data), regardless of the number or kinds of data terminals used. The agent that controls the information functions as the sole agent of the user. The user can therefore obtain the latest information, wherever he or she is, from any one of his or her data terminals only if the agent is called to the data terminal. A network address may be assigned to the agent. In this case, the network address can be used as the user's address.

An agent employment system according to the invention comprises a data terminal connected to a communications network; and a server computer connected to the data terminal by the communications network and having a region for storing an agent. The server computer has first agent-transmitting means for transmitting the agent to the data terminal at a first timing. The data terminal has agent-receiving means for receiving the agent transmitted from the server computer and second agent-transmitting means for transmitting the agent to the server computer at a second timing. In the agent employment system, the user of a data terminal can make the agent perform processes as long as the agent exists in the user's data terminal. While the agent remains in the server computer, the agent autonomously collects information in accordance with the data which it has acquired in the data terminal and which represents the user's taste. Hence, the agent can grow into one useful to the user, and the user can use it efficiently. In addition, an agent that provides technical information can be called to any data terminal so that the user may get necessary information.

An information management method according to the present invention comprises: transmitting an agent to a data terminal, together with first prescribed information, upon receipt of a transmission command for transmitting the agent; transmitting the agent from the data terminal to a server computer, together with second prescribed information, upon lapse of a prescribed time after the data terminal has received the agent; and rewiring the first prescribed information to the second prescribed information in the server computer. In the information management method, the agent is a personified one and enables the user to control and share quickly the information about a person (e.g., schedule data), regardless of the number or kinds of data terminals used.

A data-recording medium according to the invention stores a program describing the steps of: selecting an agent stored in a specific region of a computer; transmitting the agent selected, to a data terminal at a first timing, together with first prescribed information; receiving the agent at a second timing, together with second prescribed information; and rewriting the first prescribed information to the second prescribed information.

In the present invention, the agent may have an agent displaying program for displaying the agent as an electronic pet. Then, the agent can be displayed in the form of an electronic pet. This enables the user to enjoy using the useful agent.

Further, the agent may execute a program for autonomously performing processes during a period between the first timing and the second timing, in accordance with information acquired in the client computer and representing the taste of a user who uses the agent. In this case, the agent can collect information useful to the user, during the period between the first timing and the second timing. The agent can therefore efficiently work for the user.

Moreover, the agent may have a process program for performing at least one process selected from the group consisting of an image-processing process, translation process, a music-compressing process, a dictionary-retrieving process, a map-retrieving process, a game-processing process. Therefore, the agent can not only perform a plurality of processes, but also work in a field in which it is specialized. This also renders the agent useful to the user.

BRIEF DESCRIPTION OF THE DRAWINGS

FIG. 5 shows an example of a creature table relating to an embodiment of the invention.

FIG. 6 is a diagram showing a memory map of the data that determines the features of an agent displayed on the screen.

FIG. 15 is a diagram depicting screen-introducing agents.

FIG. 23 is a diagram explaining the process of changing image resolution and the like.

DETAILED DESCRIPTION

Figure 1:
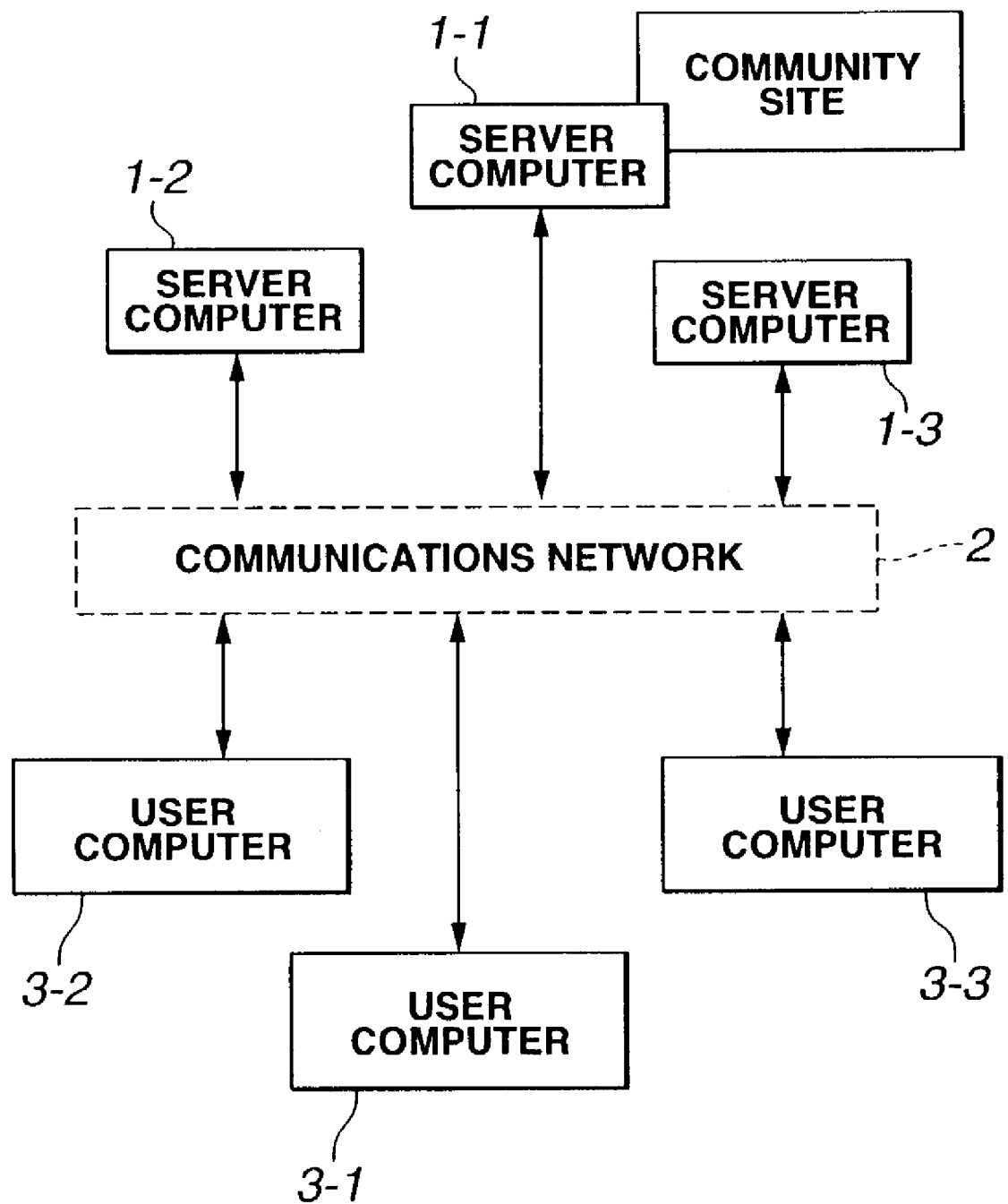
FIG. 1 is a block diagram showing an information management system and an agent employment system, both being embodiments of the present invention.

An information management system, an agent employment system, an information management method, an agent employment method, a data-providing apparatus and a data-recording medium, each using agents according to the invention, will be described, with reference to the accompanying drawings. More precisely, information management system and an agent employment system will be described below. However, it is needless to say that the following description encompasses a data-providing method, a data-providing apparatus and a data-recording medium that stores the programs for making computers perform specific processes in these apparatuses. The elements, the arrangement thereof, and the like, all described below, do not limit the present invention. Rather, various changes can be made within the scope and spirit of the invention.

Hereinafter, the agent employment system according to this invention shall be called "electronic pet/agent employment system," in order to be distinguished from the other agent systems. The electronic pet/agent employment system is a system in which electronic pet/agents work in the community provided in a server computer. At the first timing, the electronic pet/agents come to work at data terminals through a communications network. At a prescribed time bracket (a period from the first timing to the second timing), they performs various processes and provide information at the data terminals under the control of their owners. At the second timing, they leave for the community provided in the server computer through the communications network. In a time bracket (a period from the second timing to the first timing), other than the prescribed time bracket, they autonomously exchange information with one another.

The word "agent" means a software program that is activated when an event takes place and autonomously performs an appropriate process by using the knowledge base it has. In this embodiment of the invention, the agents are represented as electronic pets. The agents are classified into two types in the information management system and the agent employment system, according to this invention. The first type is a unique agent to the user. The second type is an agent that the user can buy. The user may call any agent of the second type to his or her data terminal, whenever necessary. In this specification, the first type and the second type shall be called "friend agent" and "agent for sale," respectively.

In the present specification, the word "employment" means that any agent is downloaded from the server computer to a data terminal and stays in the data terminal during the prescribed time bracket (the period from the first timing to the second timing) when an user inputs a user ID, thus registering himself or herself as the employer of the agent. During the other time bracket (the period from the second timing to the first timing), the agent remains downloaded in the server computer and is no longer employed.

More specifically, when an electronic pet comes to work, from the server computer to the data terminal, the server computer transmits a minimum necessary amount of information, i.e., files and data including the 3D-data and content data of the character, to the data terminal. The data terminal reads the file and the data and processes them. The invention is not limited to this configuration. Rather, the agent program may be moved to the data terminal, or a copy of the agent program may be transmitted to the data terminal.

The agent (electronic pet) can move from the data terminal back to the server computer in two methods. In the first method, the agent (electronic pet) downloaded into the data terminal may be sent to the server computer, without being modified at all. In the second method, the information acquired in the user site is transmitted to the server computer, and the agent program is deleted from the data terminal.

To the agent, the data terminal, the community in the server computer and the period from the first timing to the second timing are, as it were, "place of employment," "home," and "working hours," respectively. The first timing is the time when the user starts using the user computer 3-1, when the agent starts working in its place of employment, or when the owner of the agent comes home.

The first timing and the second timing can be set in whichever manner desired. They may be set, making the agent work for a specified period, once a day. The first timing and the second timing may be 9:00 AM and 5:00 PM every day. Alternatively, the first timing and the second timing may be, for example, 9:00 AM every Monday and 5:00 PM every Friday, respectively, so that the agent may work once in a week, once every ten days, or once a month. Further, the first timing and the second timing may be set so that the agent may work every other day, every two days, or the like. Moreover, the first timing or the second timing may be the time when owner of the agent gives a start command (for example, when the owner clicks a prescribed button), when the power switch of the data terminal is turned on, or when the application program, such as a game, is activated.

How the user call an agent to the data terminal he or she uses will be described in detail. The data terminal (for example, a television receiver) may already store software or the like, which is designed to displays the agent. In this case, the agent will be called to the data terminal, as will be explained below.

Figure 22:
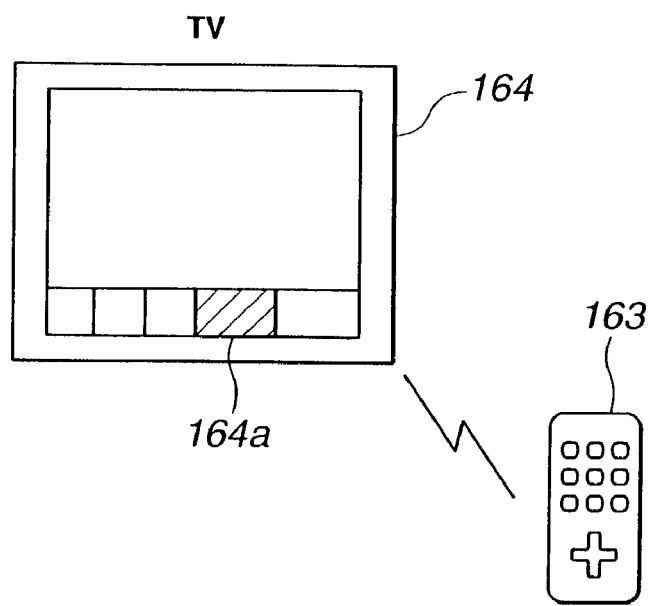
FIG. 22 is another diagram explaining how to call a friend agent.

First, the user operates a remote controller 161 or the like, designed for use in combination with a television receiver 162, thus activating an agent-calling software. More precisely, the user pushes a button 161a, if any on the remote controller 161 or the like, thereby to activate the agent-calling software. If there is not such a button, the user operates the cross-shaped button or the like provided on the remote controller 163, thereby moving the cursor to the icon 164a displayed on the screen of the television receiver 164, as is illustrated in FIG. 22. The user then clicks the icon, whereby the agent-calling software.

When the agent-calling software is thus activated, the agent stored in the data terminal is displayed on the screen. The user may instruct that the agent should call a friend agent. If so, it is required that the user should input personal identification data, such as an ID or a password. The user therefore inputs an ID or a password. The television receiver is then connected via the communications network to the server computer that stores the information about the agent. The friend agent is thereby called to the television receiver. In this case, it is preferred that the ID or the password could be input in numerals so that a keyboard may not be used necessarily.

A procedure of calling a friend agent to a data terminal (e.g., a PC) into which no software has been installed to display the agent will be described below.

The user activates the web browser installed in the PC. The PC is thereby connected to the server computer that stores the information about agents that exist on the network. The user clicks an icon or the like, calling the friend agent to the data terminal. A window is then displayed, so that it may be demanded that personal identification data, such as an ID or a password be input.

The user inputs the personal identification data. The friend agent is therefore displayed by the use of the web browser. The data transmitted at this time from the server computer includes not only the data item transmitted to call the agent to the data terminal in which the software is installed to display the agent. But also does the data includes the software required displaying the agent. Hence, even if the software for displaying the character has not been installed into the PC, it is possible to call the friend agent, provided that the web browser is available. In the embodiment, it is demanded that the user of the friend agent should input the ID or the password. Nonetheless, the user can call the friend agent, merely by inserting a memory element, such as stick into the data terminal, which stores the above-mentioned data.

FIG. 1 is a block diagram illustrating the information management system and the agent employment system, both being embodiments of the present invention. In the embodiments, server computers 1-1 to 1-3 are connected to a communication network 2, and user computers 3-1 to 3-3 are connected to the communications network 2, too. In the present embodiment, the user computers 3-1 to 3-3 and the server computers 1-1 to 1-3 are directly connected to the communications network 2. Instead, the user computers may be linked with the network 2 through some server computers if they are personal computers.

The server computers 1-1 to 1-3 are owned by, for example, providers. The communications network 2 may be the Internet, a personal-computer network, a cable network, or a dedicated channel network. Further, it may be a packet communications network, either cabled or wireless.

Figure 2:
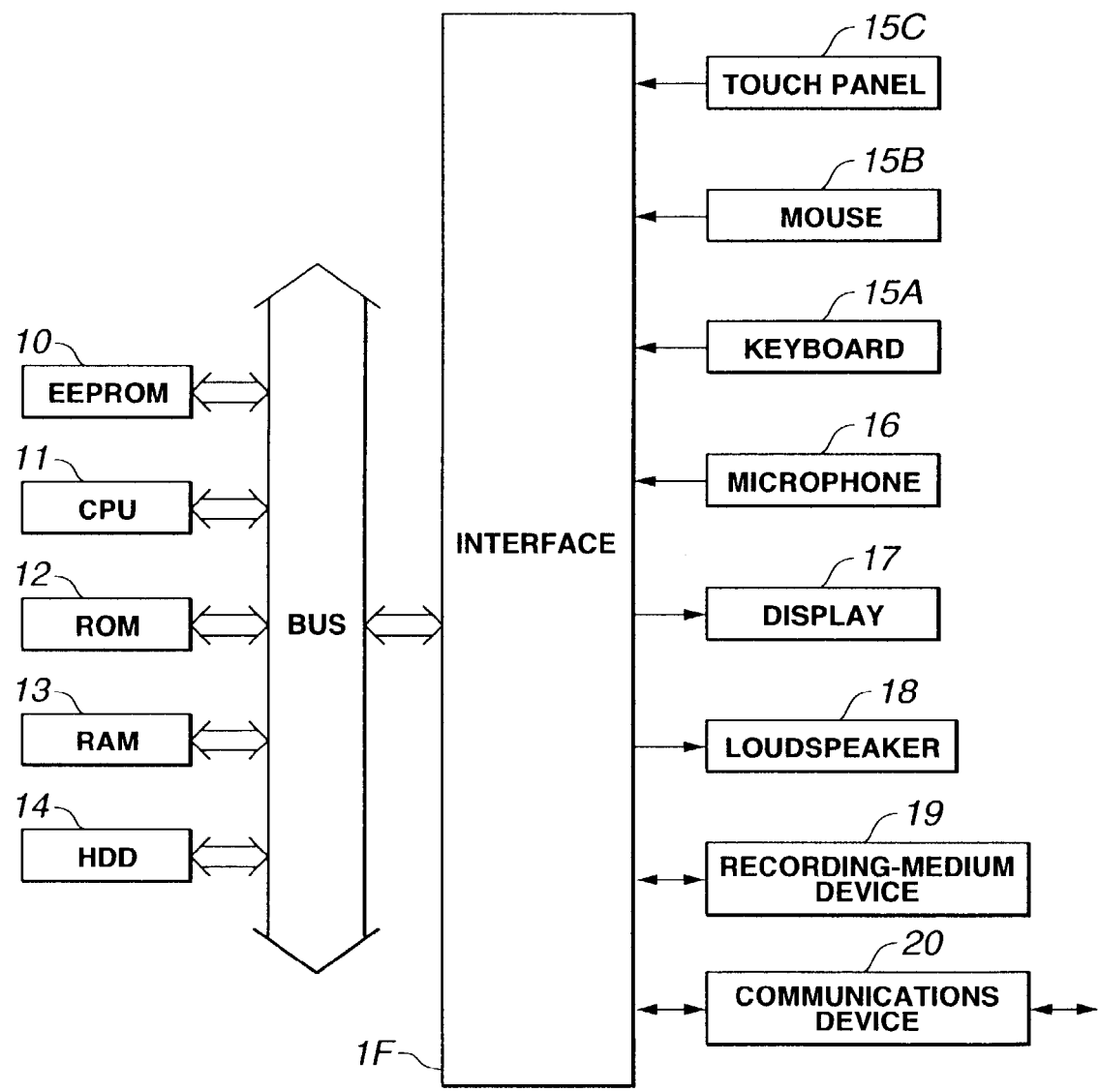
FIG. 2 is a block diagram illustrating the hardware configuration of a user computer.

FIG. 2 is a block diagram depicting the hardware configuration of the user computer 3-1. (The other user computers 3-2 and 3-3 have the same hardware configuration.) The computer comprises a CPU 11, a ROM 12, a RAM 13, an HDD 14, and a recording-medium device 19. The CPU 11 is a device that performs operations on data and controls the other components of the user computer. The ROM 12, RAM 13 and HDD 14 are data storage devices. The CPU 11 carries out various processes in accordance with the programs stored in the ROM 12, the HDD 14, or the like. The RAM 13 holds data that the CPU 11 uses to perform various processes. The user computer 3-1 further comprises an EEPROM 10, which stores data such as the terminal ID of the user computer 3-1. Note that this data should remain stored even after the power switch to the user computer 3-1 is turned off.

The user computer 3-1 further comprises a keyboard 15A, a mouse 15B, and a touch panel 15C, which are operated to input specific instructions. The user computer comprises a microphone 16, a display 17, and a loudspeaker 18, too. The microphone 16 is used to input audio signals. The display 17 displays specific image data. The loudspeaker 18 outputs specific audio signals.

The recording-medium device 19 comprises an external hard disc, a magneto-optic disc, a CD-R, a DVD, a memory stick, or the like. The device 19 stores the data transmitted to the user computer 3-1 through the communications network 2. The data can be read from the recording-medium device 19 whenever necessary. A communications device 20 is provided to transmit data to the communications network 2 and to receive the data supplied via the communications network 2. An interface IF is provided between peripheral devices, such as the keyboard 15A, communications device 20 and the like, and the CPU 11, to effect an interface process. In this embodiment, the user data terminals are computers. Nonetheless, the data terminals may be replaced with other electronic devices such as mobile telephones, PDAs or game devices.

Figure 3:
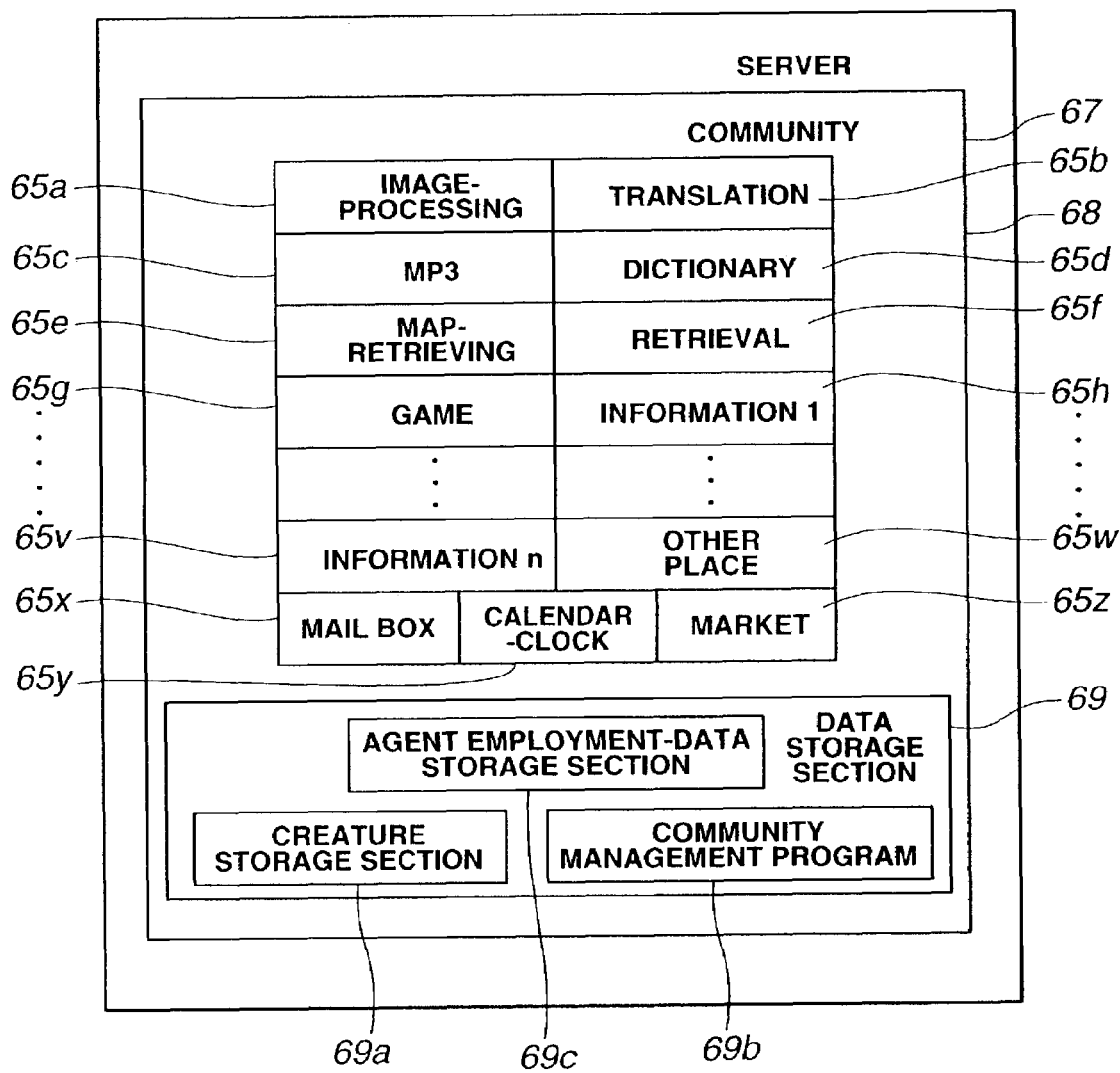
FIG. 3 is a diagram explaining a community.
Figure 4:
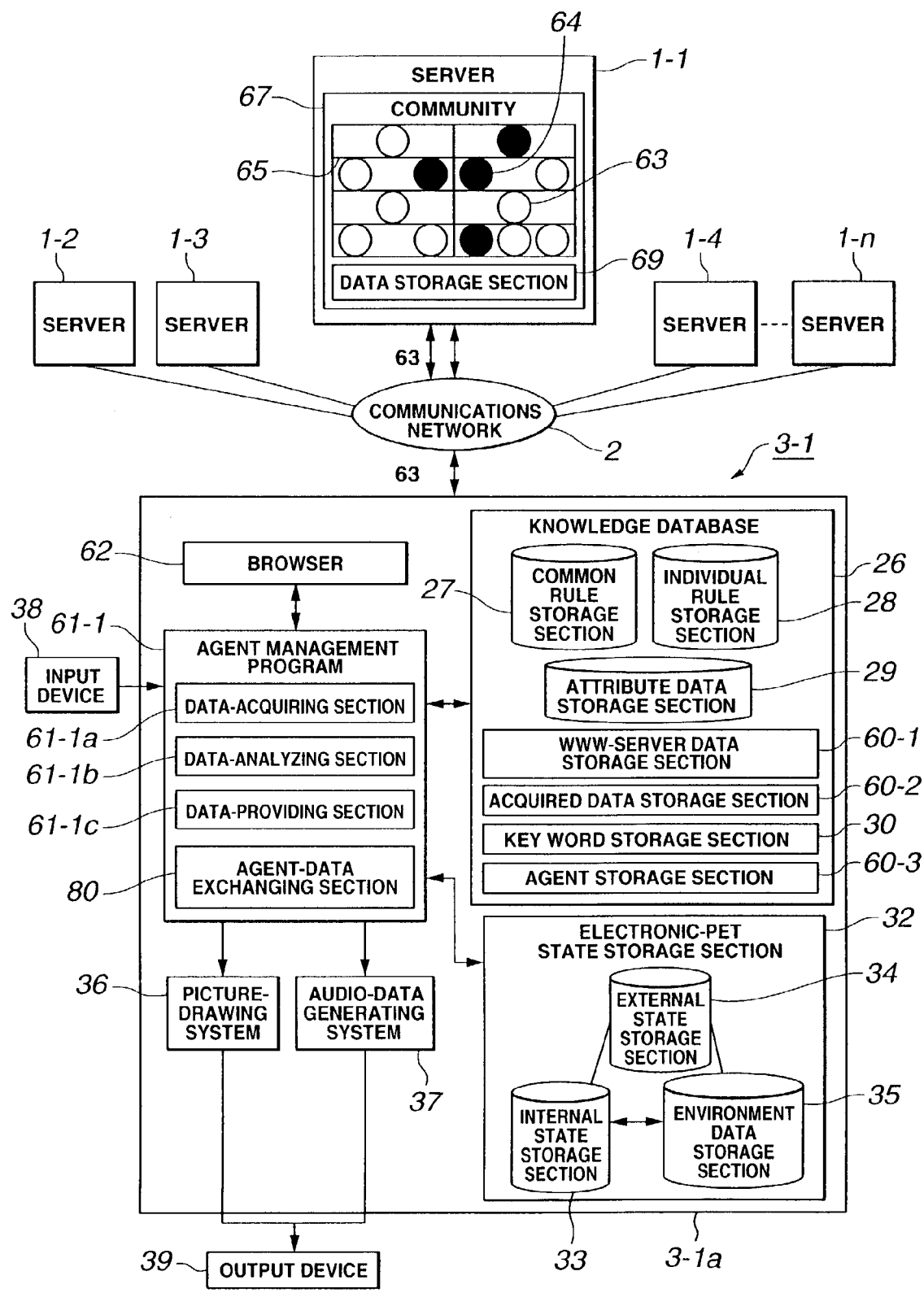
FIG. 4 is a block diagram depicting an agent employment system according to this invention.

Although not illustrated, the server computers 1 shown FIG. 1 have same basic structure as the user computer 3-1. As shown in FIGS. 3 and 4, a community 67 and a data storage section 69 are provided in a prescribed region in the server computer 1-1. The community 67 is a work area, in which creatures 64, is provided. The community 67 has a plurality of places 65a to 65z and a data storage section 69. The section 69 stores programs for the creatures 64.

In the present embodiment, the community 67 is provided in one server computer, i.e., the server computer 1-1. Nevertheless, the community 67 is not limited to this. It may be a virtual space that is defined on the basis of a particular concept.

If the community 67 is a virtual space defined by a specific concept, it will be considered to exist in a plurality of server computers 1-1 to 1-n as is illustrated in FIG. 4. To use the agent employment system according to this embodiment, however, two conditions must be satisfied. First, the owners of the agents (i.e., electronic pets) 63 that live in the community 67 is a participant to the system. Second, these agents 63 can be employed among the owners. The community is therefore partitioned into spaces that exist in the server computers 1-1 to 1-n. Thus, the space in which each agent (electronic pet) lives is provided in one of the server computers 1-1 to 1-n.

The creature 64 is a program that acts like a living thing. The creature 64 contains an electronic pet/agent displaying program that causes the output device of the user computer 3-1 (i.e., data terminal or another information apparatus) to display the creature as a character. The creature 64 can grow into an agent. In most cases, however, the display 17 displays it as an immature, electronic pet at an initial stage.

The information as to how creatures 64 behave in what conditions and what sounds (languages) they utter is stored in the creature storage section 69a that is provided in the community 67. The information stored in the section 69a includes various data items. Among the data items are: data items such as "knowledge on daily life" and "knowledge on various subjects," a calendar data item, a data item showing the frequency at which each pet appears on the screen, a data item indicating the frequency at which the pet asks the user questions, an data item showing the type of sound the character utters, a data item representing the kind of the character (a creature from outer space, an animal, a plant, a robot, or the like). These data items will continuously change as the user of the agent interacts with the agent system. As the data items change, the information the creatures 64 give the user will continuously change.

The creature storage section 69a stores the internal parameters and external parameters of each electronic pet and the data items about the physical environment of the creature. The internal parameters (i.e., parameters that any other electronic pet cannot perceive) include emotion, hunger and interest and the like of the pet. The external parameters (i.e., parameters that any other electronic pet can know) include the position, orientation and color of the pet. The data items about the physical environment of the creature represent the objects other than the electronic pets, the temperature, the gravity, the date, and the like.

The creatures 64 may be various programs. Among the creatures 64 are agent (electronic pets) 63. That is, the term "agent" can be said to mean one of the occupations each creature 64 may have. In the following description, "agent" and "electronic pet" will be used to mean the same thing.

Some creatures 64 can act as agents 63 once stored into the community 67. Most creatures 64s do not have, at first, data that enables it to act as an agent 63. The creature 64 grows into an agent 63 as its owner, or breeder, rears it, making it participate in the events held in the community 67 and acquire various information. Namely, the creature 64 becomes an agent 63 as it gradually accumulates data and programs.

The agents 63 are agent programs that can perform a variety of processes. The program that can be executed in the agent 63 differs from the program that can be executed in any other agent. Each agent has at least one of process programs, such as image-processing program, translation program, music-compressing program, dictionary-retrieving program, map-retrieving program, game-processing program, E-mailing program and schedule-managing program.

The image-processing program is used to process various data items that represent characters, images and pictures. The term generally means a program that performs mathematical processes on information to generate new images. The program may be one that performs a process employing binary encoding, raster-vector conversion and the like. More particularly, the program processes digital data to change colors, emphasize forms, adjust gradation, remove unnecessary data components such as noise, and eliminate blur and fog from images.

The translation program translates a natural language (e.g., Japanese, English, French, German, Russian, Italian or the like) into a target language. It may be compiler, assembler, interpreter or the like, which translates an artificial language into another artificial language.

The music-compressing program compresses digital music data. It may be MPEG 1 to 4, JPEG, LHA, archival file or the like. The agent may have a data-compressing program (MPEG 1 to 4, JPEG, LHA, archival file, etc.) and an expansion (de-freezing) program, in addition to the music-compressing program.

The dictionary-retrieving program retrieves any desired one of the dictionaries, including technical dictionaries in word processor and the user dictionary. This program may be edited into one that retrieves the information the user wants, from a Japanese dictionary, a Japanese-English dictionary, a technical dictionary, a lexicographical database.

The map-retrieving program retrieves the information about a place, which the user wants. The game-processing program is a computer game program; it may be a program that assists programmers to write game software.

The agent 63 may have a program for performing a data-acquisition process and an agent process program. The term "data-acquisition process" means a process in which the agent 63 acquires specific information by accessing, in accordance with a prescribed key word, the server computers 1-1 to 1-n that are connected to the communications network 2. During the data-acquisition process, the agent 63 intermediates between the user and a retrieval engine provided on the network.

Assume that the key words are "trip to Hokkaido." Then, the agent 63 accesses the server computer that is designated with the words "Hokkaido" and "trip" and acquires information about a "trip to Hokkaido." A database on the "trip to Hokkaido" is built in a storage area provided in the computer that controls the agent 63. The database may be built in the agent 63, not in the storage area provided in the computer. The agent 63 acquires information not only in accordance with a command given by the user, but also based on the information obtained from the user's instructions and representing the user's taste. The agent 63 may therefore give the user some information and topics of conversation. Moreover, the agent 63 may search for other agents that can probably collect information interesting to the user, may acquire such information and may give it to the user. (It does not matter whether the other agents can be bought or sold.)

The term "agent process" means a process in which the agent 63 performs various jobs on behalf of the user. In the agent process, the agent 63 can collect information, select data items from the information, make reservations, perform registering, and settle accounts. For example, the agent 63 may select one of the trip items offered by travel agents, which seems most interesting to the user, may make a reservation for the trip item selected, and may pay the bill for the trip.

At this time, the agent 63 autonomously accesses the server computers 1-1 to 1-n connected to the communications network 2, in accordance with the user's demand and the key words showing the user's taste. Thus, the agent 63 performs the agent process.

The agent 63 (i.e., an electronic pet) is a creature 64, as well. Therefore, it is natural that the agent 63 should have an agent-displaying program that causes the display 17 of the user computer 3-1 to display the outer appearance, language and behavior pattern of the creature. The agent-displaying program corresponds to the display program that the creature 64 has, which has a different name.

The agent-displaying program performs another function. It causes the data terminal to change the mode of displaying the agent. To be more specific, the data terminal that displays the agent may be a personal computer (PC), a mobile telephone, a game apparatus, or any other kind of an electric apparatus. These apparatuses differ in terms of display resolution, number of colors that can be presented, length of character trains, data-processing ability and the like. To enable the user to operate various types of data terminals in almost the same way, the parameters input to one type of a data terminal must be different from those input to any other types of data terminals. It is the agent-displaying program that gives each data terminal the parameters that are different from those input to any other type of a data terminal.

Figure 23:
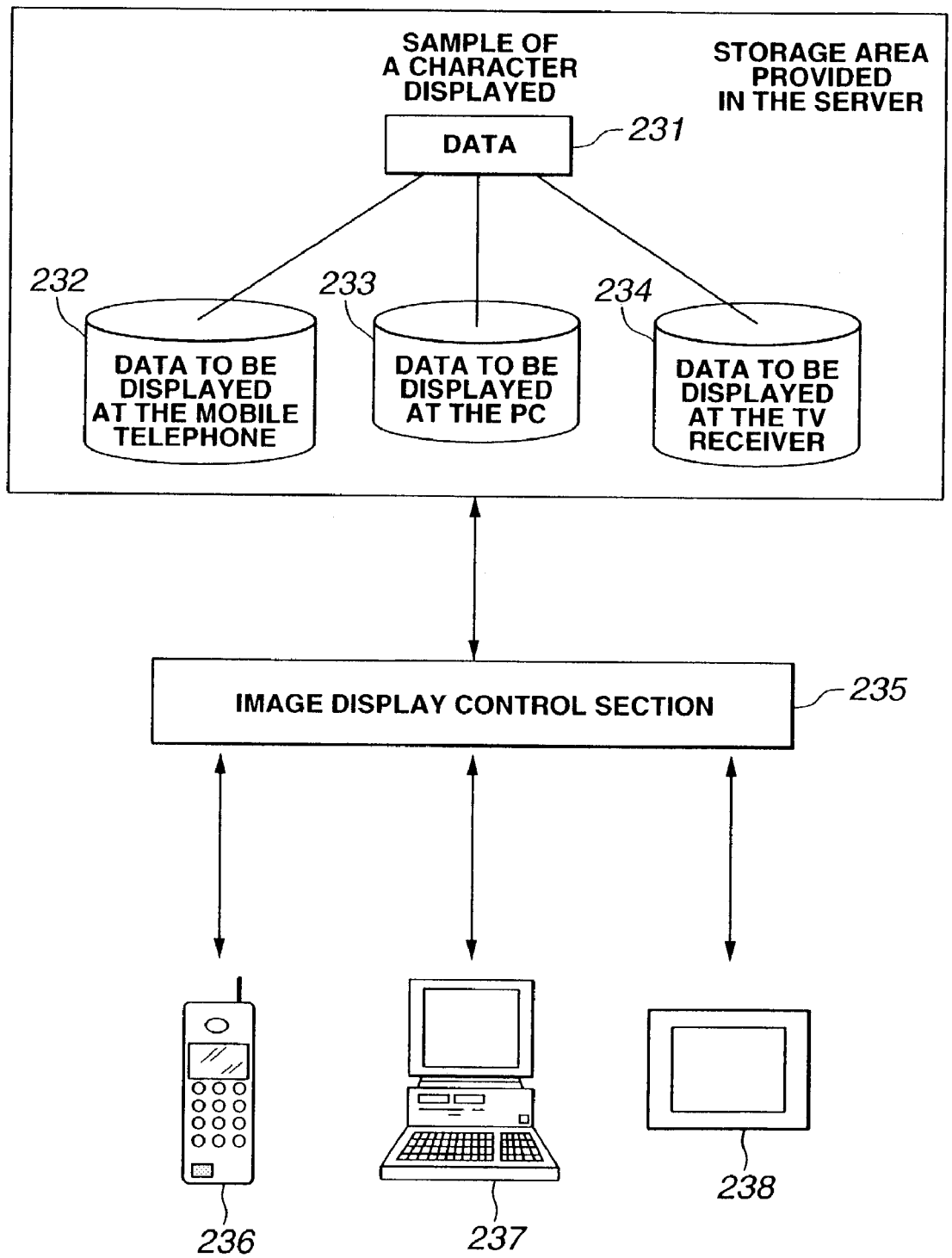

How the resolution and the like are changed in the data terminal that displays the agent will be descried, with reference to FIG. 23.

A basic data item 231 for displaying the character is stored in the storage area of the server computer. Modified data items 232, 233 and 234 are stored in the storage area of the server computer, too, to display the character at data terminals, respectively.

The user of the agent may want to call a friend agent to a mobile telephone 236. In this case, the user instructs that the agent incorporated in the mobile telephone 236 should "Call a friend agent."

In response to the instruction the image display control section 235 provided in the server computer makes the mobile telephone 236 detect that it should display the friend agent. The instruction causes the image display control section 235 to transmit the data that is stored in the memory area of the server computer to the mobile telephone 236, so that the data may be displayed at the mobile telephone 236. As a result, the mobile telephone 236 displays the agent in the resolution appropriate for the mobile telephone 236. The agent-displaying program mentioned above controls these operations of the image display control section 235.

As described above, the image display control section 235 selects and transmits the data modified for each data terminal after it detects the data terminal that the user is using. Nonetheless, the section 235 may transmit all modified data items 232, 233 and 234 to the data terminal, not selecting one of these data items, and the data terminal may selects a desired one of the data items it has received from the image display control section 235.

The agent 63 specializes in a particular field, which may be travel, music, language, science-technology, or the like. The special field may be divided into sub-fields. For example, the science-technology field may be divided into information technology, semiconductor devices, fuels, pharmaceuticals, and the like.

There are provided an agent specializing in travel, an agent specializing in music, an agent specializing in architecture, and so on. The user can select an agent that specializes in the field he is interested in. Thus, the agent can be called to the user's data terminal.

Figure 20:
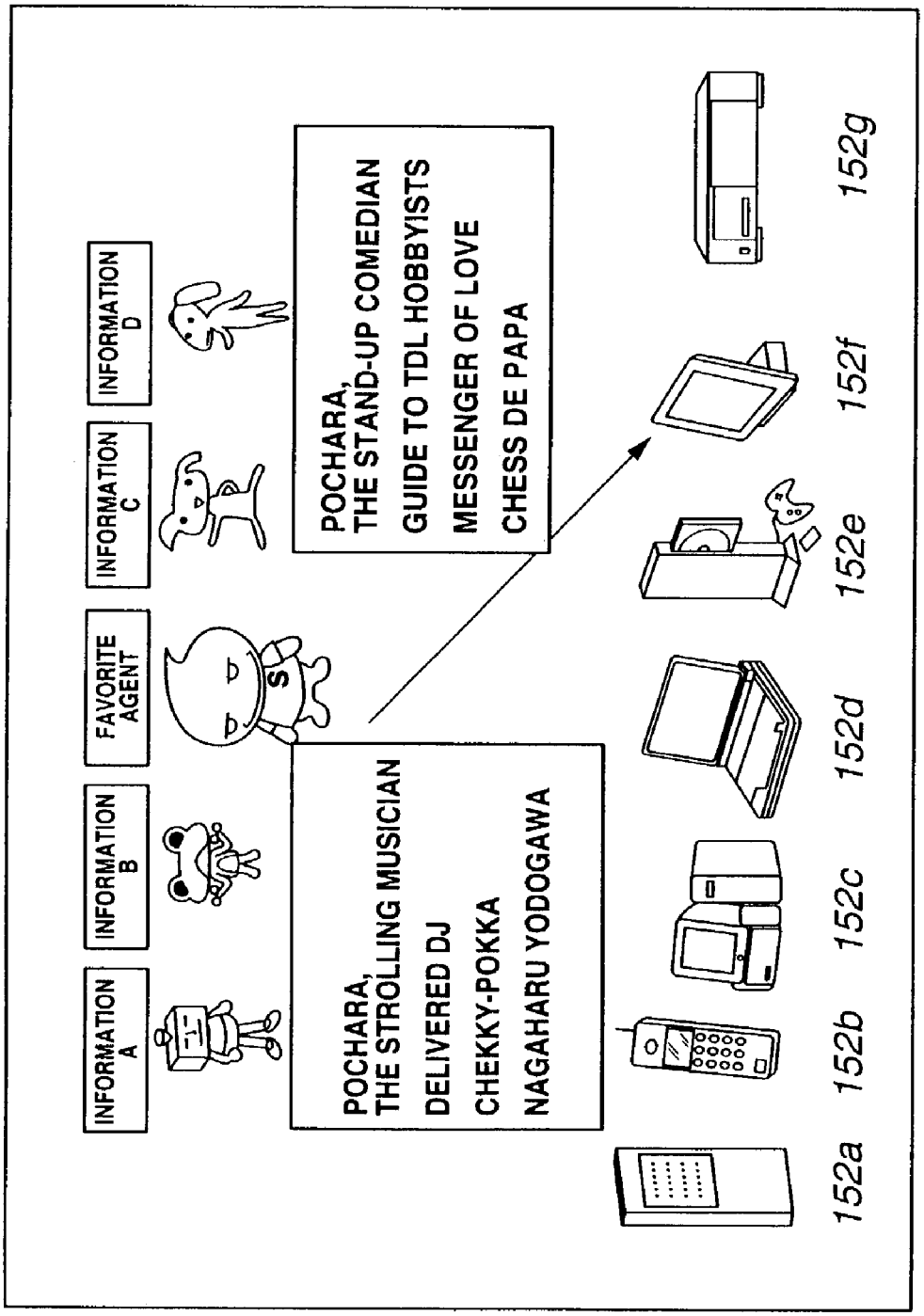
FIG. 20 is a diagram explaining how an agent specialized in a particular field is called to a data terminal.
Figure 21:
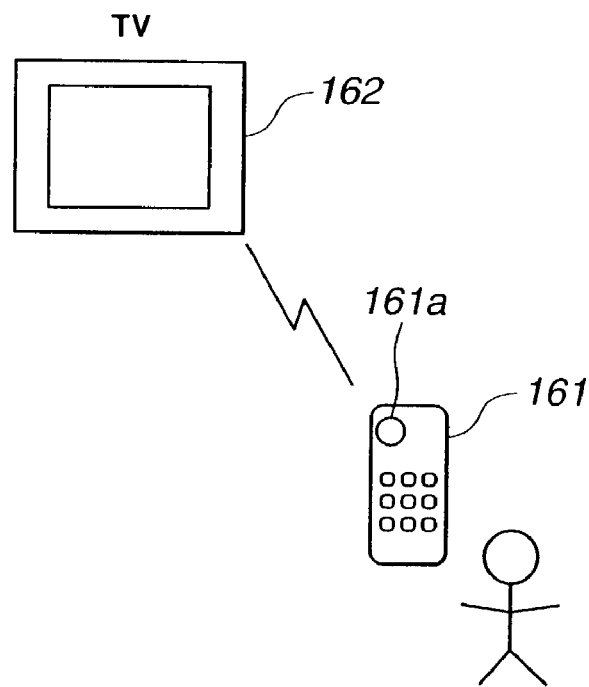
FIG. 21 is a diagram explaining how to call a friend agent.

FIG. 20 is a diagram explaining how an agent specialized in a particular field and selected by the user is called to the data terminal that the user will use. Shown in the upper part of FIG. 20 is a list of agents the user can select. The list includes "Pochara, the strolling musician," "Delivered DJ," and so on. Shown in the lower part of FIG. 20 are the icons of the data terminals to which the agent selected can be called. The data terminals include "PDA," "mobile telephone," and the like. The user selects one agent through any one of the data terminals he or she has selected, so that the agent selected may be called to the data terminal selected. The user confirms the content of the information the agent provides. Thereafter, the user instructs that the agent should leave for home (for example, by selecting a "You may go home" menu). Then, the agent disappears from the display screen of the user's data terminal.

The fee for the information the agent has provided may be calculated from the time that has elapsed from the time when the user called the agent to the data terminal to the time when the user selected the "You may go home" menu. The fee thus calculated may be charged only if the user is satisfied with the information the agent has provided. If the user is not satisfied with the information, only the commission will be collected from the user.

It is desired that the agent 63 should have a network address. The network address is, for example, an IP address of IP ver. 6. If the agent has an IP address, the IP address can be the present address the user of the agent has on the network. In the age of "ubiquitous" when every electric apparatuses may be connected to networks, everybody will have a device storing the network addresses of many people. It will be hard for any person to quickly understand to which address the information should be transmitted so that the receiver may quickly grasp the contents of the information. In view of this, an IP address may be assigned to the "favorite agent" shown in FIG. 20, which is the receiver's agent. In this case, the sender of information can transmit information to the IP address, not caring about which data terminal the receiver of information is now using. More specifically, once the sender has transmitted information to the IP address assigned to the agent of the receiver, the data terminal to which the agent is called temporarily assumes the very IP address assigned to that agent, or the server computer replaces the IP address with the IP address assigned to the data terminal to which the agent is called. The sender can therefore transmit information to the data terminal now used by the receiver of information.

A network address may be allocated to any agent. If so, the user can call the agent whenever and wherever the agent is located. For example, the user insets a storage medium (e.g., a memory stick) that stores the agent's IP address and the procedure of connecting the agent to the server computer, into the television receiver installed in his hotel room. The user can then call the agent.

The places 65a to 65z are work areas of the creatures 64. As shown in FIG. 3, they are categorized and marked off, one from another. They are an image-processing place 65a, an translation place 65b, a music-compressing place 65c such as MP3, a dictionary place 65d, a map-retrieving place 65e, a retrieval place 65f, a game place 65g, information 1 place 65h to information n place 65w, and so on.

The information 1 place 65h to the information n place 65w are categorized to, for example, cars, driving-rout maps, domestic tourism, overseas tourism, sports, and music. Each category has various items. The place categorized to cars, for example, has items such as a car model, a driving route, parts, makers, and so on. One pointer is registered in each category to designate one of the items included in the category.

The community 67 has another place 65w for a creature 64 that has not grown yet into an agent 63 because it has but an insufficient amount of data. Each of the places 65a to 65w may be divided into smaller regions, if necessary. The community 67 further has some other places, i.e., an E-mail box 65x, a calendar-clock 65y, and an agent market 65z that are used to buy and sell the agent 63. These places 65x, 65y and 65z are work areas that are used to transmit information, manage time, buy and sell agents, respectively.

The E-mail box 65x is an area in which mails the user receives are saved. It is desirable to provide one area for one user. If one E-mail box is provided for one user, mails can be managed in the same manner in two or more data terminals of the user. Hence, the user can obtain the latest information by calling the agent to any one of his or her data terminals.

The calendar-clock 65y is used to determine the first timing at which the agent comes to work and the second timing at which the agent leave for home.

The user's schedule can be managed at the calendar 65y. To enable a plurality of data terminals to share the schedule management data, so-called "exclusive control" must be carried out while the information sent from any one of the data terminals is being updated, thereby to prevent the updating of the information transmitted from other data terminals. Additionally, if the user updates the information in one data terminal, it is necessary to perform so-called "data-updating control," thereby to feed the information updated in all data terminals back to the control tools. These controls are difficult for elderly people and children, who are unfamiliar to information apparatuses. It is hard for them to utilize the controls.

Figure 19:
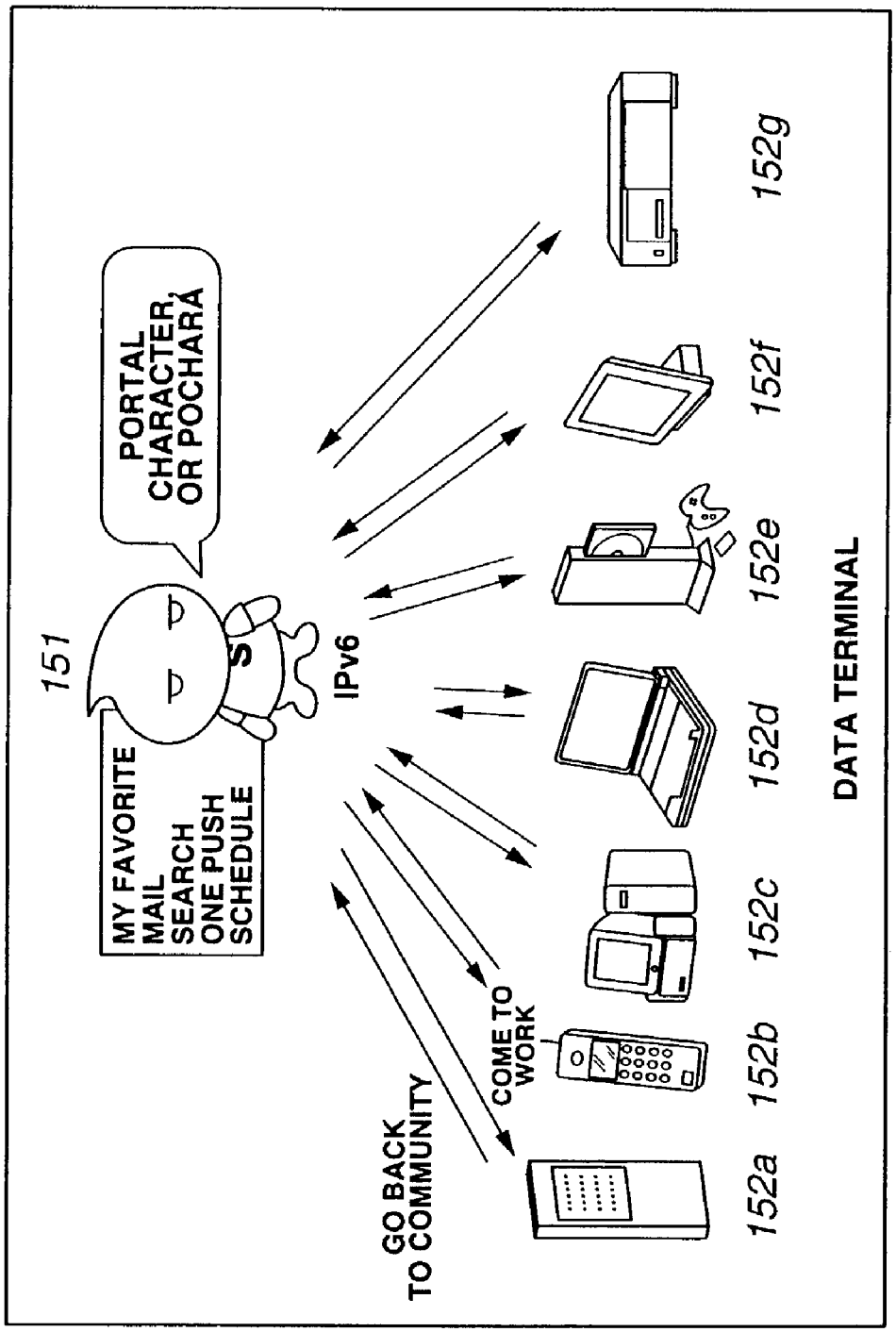
FIG. 19 is a diagram explaining the procedure of achieving schedule management.

Nonetheless, the user can perform these operations, by intuition, only if he or she uses one agent that serves to achieve schedule management. The "schedule management", which is one configuration of the information management system according to the present invention, will be described, with reference to FIG. 19. The agent that performs the schedule management and the schedule management area (calendar) exist on the server for each user. The agent that performs the schedule management is a so-called "friend agent" that corresponds to the user of the agent in one-to-one relationship.

To write a new schedule on the calendar, the user first calls the agent to the data terminal he or she is using now, such as a PDA 152a. (That is, the user makes the agent "come to work.") Next, the user writes the new schedule on the PDA 152a. The PDA 152a transmits the new schedule data to the server computer 151. (Namely, it makes the agent "leave for home." Thereafter, the agent writes the schedule data updated, or new schedule data, into the calendar 65y of the user, which exists in the server computer 151. The schedule data is registered in the server computer 151, as the latest information that the user has updated. When the agent is called to a data terminal, it gives the schedule data to the data terminal.

Assume that the user operates his or her mobile telephone 152b. When the user calls an agent that can perform schedule management, the agent appears in the telephone 152b, holding the latest schedule data recorded in the server computer 151. If the user wants to add a new schedule to the schedule data, he or she operates the mobile telephone, inputting the new schedule. The data representing the new schedule is stored into the agent, thereby updating the schedule data. The agent is sent back to the server computer 151. Thereafter, the agent writes the latest schedule data on the user's calendar 65y existing in the server computer 151.

As indicated above, the user has one agent that can perform schedule management. Through only the agent the user can update the schedule data. This prevents different data items from being simultaneously written from a plurality of data terminals into the calendar provided in one sever computer. The user of the agent can easily achieve, through the agent, the "exclusive control" and the "data-updating control," both necessary to enable the data terminals to control information and share the same schedule management data.

Thus, the user can perform the "exclusive control" and the "data-updating control," merely by first calling the agent to any one of his or her data terminals, then updating the schedule data and finally sending the agent back to the server computer. Even elderly people and children can operate the data terminal to accomplish these controls, though they are unfamiliar to the data terminals. This helps solve the social problem known as "digital divide."

The market 65z is a work area for transfer the property right to agents. In the present embodiment, the agents 63 are bought and sold in the market 65z, thus transferring the property right to them. Instead, the agents 63 may be exchanged, one with another, in the market 65z, without the transfer of property right or the transfer of money.

The data storage section 69 of the community 67 comprises a creature storage section 69a, a community management program 69b and an agent sales-data storage section 69c. The creature storage section 69a stores the creatures 64 including the agents 63. The creatures 64 include not only movable agents, but also stationary agents that stationed in the community 67.

The creature storage section 69a comprises a RAM or the like and stores a creature table. The creature table contains the information about the creatures 64 including the agents 63.

FIG. 5 is a diagram illustrating the creature table. The creature table has a creature ID column 111, a place column 112, an agent column 113, an agent-age column 114, a creature-birthday column 115, a basic appearance column 116, an employability column 117, a wages column 118, and an owner ID column 120. The IDs of the creatures 64 are described in the creature ID column 111. Each ID does not distinguish a creature 64 from an agent 63.

Described in the place column 112 are the places where the creatures 64 including the agents 63 may be stored. Described in the agent column 113 is information showing whether the creatures 64 are the agents 63 or not. In this column, "1" is written if the creature has grown into an agent, and "0" is written if the creature has not so grown.

In the agent-age column 114 there is described the number of years each agent 63 has lived after it had matured from a creature 64. The agent age can be used as data from which the size the agent-processing program and the data amount of the agent. Namely, although there is an individual difference in each agent, it can be assumed that the size of the agent-processing program and the data amount of the agent are large if the agent age is high.

Described in the creature-birthday column 115 are described the dates when the creatures 64 including the agents 63 were generated. Described in the basic appearance column 116 are the addresses in a memory map 27a that shows the basic outer appearances of the agents 63. The memory map 27a will be described later.

Described in the employability column 117 are the data items showing whether the agents 63 can be employed or not. The data item about each agent 63 is "1" if the agent can be employed in the agent market 65z, and is "0" if it cannot be employed there.

In the wages column 118, there are described the wages at which the agents 63 are employed. Described in the owner ID column 120 are the IDs of the users, or the owners of the creatures 64 including the agents 63. If the provider of the agent system is an owner of a creature 64, his or her ID will be described.

The owner of the creature 64 may be a seller who sells the agent 63 in the community 67. The seller of the agent 63 may be a software firm, a trade company, an agent breeder, or the like.

In the present invention, the word "breeder" means a person who rears agents. The breeder brings up the agents, either for a hobby or a business. To breed an agent is to own or rent the agent, collect a number of data items and give the data items to the agent, thereby changing the agent to a desirable one.

The community 67 may be a virtual space that is defined on the basis of a particular concept and may be provided in a plurality of personal computers 1-1 to 1-n. If this is the case, the creature table has a column for describing an URL that should be linked with the place where the creature 64 (including the agent 63) lives.

The creature table is configured to be rewritten whenever necessary. The data in the table is rewritten or updated when the owner of the agent 63 changes, when the creature 64 grows into an agent 63 or when the agent 63 changes in basic outer appearance in order to, for example, store a new creature 64 into the community 67. The data described in the creature table may have either a fixed length or a variable length.

The agent employment-data storage section 69c stores the data about the employable agent 63, which has been extracted from the creature table. That is, the data items about the agent 63, for which "1" is described in the empolyability column 117, are extracted from the creature table and stored into the section 69c. (These data items are described in the creature ID column 111, place column 112, agent-age column 114, creature-birthday column 115, basic appearance column 116, wages column 118 and owner ID column 120.)

The agent employment-data storage section 69c may store the data about employable creature 64. Thus, a creature that has yet to mature into an agent may enter into an employment contract.

The community management program 69b includes a software program that serves to transfer agents 63 between the server computer 1-1 and each user computer 3-1, at the request made by the user computer 3-1. This function is realized when the CPU 11 carries out the program.

That is, the community management program 69b comprises two agent-sending means. The first agent-sending means sends the agent 63 to the user computer 3-1. The second agent-sending means receives the agent 63 from the user computer 3-1. These means perform their functions when the calendar-clock 65x provided in the community 67 detects the first timing and the second timing, respectively, which have been set by the user. The program for causing these means to function will be explained later, with reference to FIG. 12.

The community 67 stores creatures 64 including agents 63. Thus, the agents 63 can of course exchange information among themselves in the community 67.

The agent employment system according to this embodiment will be described in detail, with reference to FIG. 4. The agent employment system comprises a server computer 1-1 and a user computer 3-1. The relation between the computers 1-1 and 3-1 will be explained, though the system further comprises other server computers and other user computers, as shown in FIG. 1.

The user computer 3-1 comprises an agent management program 61-1, a browser 62, a knowledge database 26, an electronic-pet internal state 33, an external state 34, an electronic-pet state storage section 32, a picture-drawing system 36, an audio-data generating system 37, an input device 38, and an output device 39. The section 32 stores the environment data 35.

The server 1-1 to 1-n act as information sources in the case where the agent 63 exits in the user computer 3-1 and acquires information from the external computers.

The agent 63 moves to or has access to the server computer 1-n that stores the information it wants to acquire through the communications network 2. The agent 63 autonomously retrieves a key word to select the server computer 1-n that has the information it wants to obtain. That is, the agent 63 uses a specific key word, having access to sites, and then acquires the information from the sites accessed.

The agent management program 61-1 controls the will and behavior of the agent 63 that acts as an electronic pet, in accordance with the information about the agent, the internal and external states of the agent 63 and the environment data about the agent 63. The information about the agent has been supplied from the knowledge database 26. The data representing the internal and external states is stored in the electronic-pet state storage section 32. The environment data is stored in the storage section 32, too. The results of the control are stored into the electronic-pet state storage section 32.

The agent management program 61-1 generates an agent 63 that can autonomously act. The agent 63 thus generated can act as a characterized electronic pet on a display screen such as a television screen. The agent 63 controlled in an agent management system 3-1a is not limited to one only. Rather, two or more agents may be controlled in the system 3-1a.

The agent management program 61-1 comprises a data-acquiring section 61-1a, a data-analyzing section 61-1b, a data-providing section 61-1c, and an agent-data exchanging section 80. The data-acquiring section 61-1a acquires the user information, the information selected from media such as TV programs and radio programs, and the similar information. The user information, the information selected, and the like are stored into an acquired data storage section 60-2, which will be described later.

The agent management program 61-1 is stored in the HDD 14. A monitoring program is always stored into the RAM 13. The CPU 11 performs processes in accordance with the monitoring program stored in the RAM 13.

The history of the user's execution of the program can be always obtained in the form of log data, even if the agent 63 that is an electronic pet (agent 63) is not displayed on, for example, the display screen of the user computer 3-1 (that is, even if the agent control program is not executed).

The data-analyzing section 61-1b analyzes the user's taste based on the user information and generates a key word from the result of analysis. More specifically, the section 61-1b acquires the agent management program 61-1 and the user information, both stored in the HDD 14, and store them into the RAM 13. Then, the section 61-1b cooperates with the CPU 11 to perform operations on the user information, analyzing the user's taste and generating a key word. The key word thus generated is stored into a key word storage section 30.

The key word is written from the key word storage section 30 into the RAM 12. The CPU 11 performs an operation on the key word. The agent 63 then autonomously searches the server computers 1-1 to 1-n for a timely topic that agrees with the user's taste and then presents the topic to the user. The topic may be a weather forecast, a traffic jam report, current news, entertainment news, new musical works, or the like.

Not only can the electronic pet agent 63 autonomously provide information, but also the user can designate a time bracket and the address of an information site to obtain the information about anything that he or she has selected. For example, the user may wish to know how the baseball game is going on while he or she is using computer. In this case, the user designates the time bracket of the baseball game and the address of the site that gives quick reports on the game.

The user then gives a message of, for example, "Let me know the result of the game." to the electronic pet (agent 63). The agent 63 acquires the information representing the result of the game, from the designated site in the server computers 1-1 to 1-n and transmits the information to the user. In this case, the electronic pet (agent 63) appears in a corner of the screen of the display 17 of the user computer 3-1. The electronic pet displays a message of "Team A won at 1 to 0." or "Team A won in the bottom of the ninth inning."

Alternatively, the user may request that a specific news site should give him or her top news. More precisely, the user may request that a quick news site should give him or her quick news reports, excluding weather reports designated by inputting a key word. In this case, the electronic pet/agent 63 displays a message of, for example, "Today an earthquake hit the Kanto area." This dialog is accomplished by the use of the agent management program 61-1.

Further, the agent may be designed to inform the condition of the data terminal. For example, the agent informs the battery in the mobile telephone is running out and that a new mail has just arrived.

The data-providing section 61-1c is configured to select information for the user, to determine the will and action of the electronic pet/agent 63 from the instinct and ability of the electronic pet/agent 63 and to give the information to the user.

That is, the data-providing section 61-1c uses the retrieval key word to obtain, from the server computers 1-1 to 1-n, the information that the user will probably need. The section 61-1c gives the user the information thus obtained.

The data-providing section 61-1c determines what expression or what costume the electronic pet (agent 63) will have or wear when it gives the information. The section 61-1c determines the expression or costume from the data stored in the common rule storage section 27 that is incorporated in the knowledge database 26. The common rule storage section 27 will be described later.

The data representing the manner in which the electronic pet (agent 63) gives information, which the data-providing section 61-1c has determined, is supplied to the electronic-pet state storage section 32, updating the data stored in the section 32. The electronic-pet state storage section 32 will be described later.

The data representing the manner in which the electronic pet/agent 63 gives information, which the data-providing section 61-1c has determined, is input to a picture-drawing system 36 and an audio-data generating system 37, which will be described later. The system 36 generates an image of the electronic pet (agent 63) from the data supplied from the data-providing section 61-1c. The audio-data generating system 37 generates a speech the electronic pet/agent 63 will utter, from the data supplied from the data-providing section 61-1c. (If the user has no display, only the speech may be output.)

The knowledge database 26 is stored in the storage device such as the HDD 14. The knowledge database 26 contains the behavior data about the electronic pet (the agent 63), the attribute information about the user, various key-word data items, data items to be given to the user, and the like. The behavior data includes data items that represent how the electronic pet acts, what language it speaks and how it behaves.

The knowledge database 26 comprises a server data storage section 60-1, an acquired data storage section 60-2, the common rule storage section 27, an individual rule storage section 28, an attribute data storage section 29, and the key word storage section 30. The server data storage section 60-1 stores the information concerning the server computer 1-1. More specifically, the section 60-1 stores the address of the server computer 1-1 that the agent 63 has accessed. It also stores the information resources including the places 65 provided in the community 67.

The agent 63 of this embodiment can write and read information into and from the acquired data storage section 60-2, agent storage section 60-3, common rule storage section 27, individual rule storage section 28, attribute data storage section 29 and key word storage section 30, which will be described below. The other agents stationed in the user computer 3-1 and the mobile agents can write and read information into and from these components, too. This means that two or more agents share the acquired data storage section 60-2, common rule storage section 27, individual rule storage section 28, attribute data storage section 29 and key word storage section 30. The following description of the section 60-2, section 27, section 28, section 29 and section 30 holds true of not only the agent of this embodiment, but also any electronic pet/agent that can be stored in the user computer 3-1.

The knowledge database 26 is read and written into the RAM 13 when the agent management program 61-1 is activated. The CPU 11 performs operations on the knowledge database 26. The display therefore displays the electronic pet/agent 63 as an animation image that moves and changes its expression. Thus, the pet/agent 63 can autonomously talk with the user, asking questions and chatting. (If the user has no display, the pet/agent talks through a loudspeaker or the like.)

The electronic pet (agent 63) may keep speaking to the user (not listening to the user) or may ask the user questions to receive answers. If the electronic pet (agent 63) only speaks to the user, the message uttered when the agent management system 3-1a is activated may be "Hello!," "It is raining today. Take an umbrella with you." or the like.

The agent may offer topics that may agree to the user's taste. Hence, the user need not search the network for information as with the conventional system. The user can receive the information interesting to him or her, just like television programs. If the user wishes to obtain special information, he or she may employ an agent that knows plenty of such information and call the agent to his or her data terminal. The user can then acquire necessary information.

The message may contain a piece of news, an event in the past and an event scheduled for the future. These contents of the message may be stored in the acquired data storage section 60-2. Alternatively, they may be generated from the information obtained from the server computers 1-1 to 1-n or from any other agents.

The electronic pet (agent 63) may ask questions, such as "Do you like sports?," "Do you like baseball games?," and the like. The user answers these questions. The user's answers to the questions made by the electronic pet/agent 63 are stored, as user information, into the user profile provided in the attribute data storage section 29, as will be described later.

The common rule storage section 27 stores the common information that represents the instinct of the electronic pet/agent 63. The section 27 stores data for setting, for example, the expression, motion and voice of the electronic pet and the reaction the pet may make in response to the user or electric devices.

The common rule storage section 27 incorporates a memory map 27a of the data items that determines the features of the electronic pet/agent 63 displayed on the screen. As FIG. 6 shows, the memory map 27a is configured to record the basic appearance, motion, message, expression and the like, at specific addresses of the user area. The data items can be read from the addresses so that the electronic pet/agent 63 may have the basic appearance, show the expression, wear a particular costume, makes a specific motion, utter a voice and make a reaction.

The electronic pet/agent 63 can take, for example, six different basic appearances. Basic appearance 1 is a dog, basic appearance 2 is a human being, basic appearance 3 is an imaginary animal, basic appearance 4 is a fish, basic appearance 5 is a creature from outer space, and basic appearance 6 is a dinosaur. The data items representing these basic appearances are stored in the common memory map 27a.

The electronic pet/agent 63 can have, for example, seven different expressions. Expression 1 is smile, expression 2 is anger, expression 3 is sadness, expression 4 is relaxation, expression 5 is impression, expression 6 is expressionless, and expression 7 is disappointment. The data items indicative of these expressions are stored in the memory map 27a.

The electronic pet/agent 63 can be dressed in, for example, six different costumes. Costume 1 is a business suit, costume 2 include a camera, costume 3 includes a headphone, costume 4 is a uniform, costume 5 includes a napkin, and costume 6 includes a personal computer. The data items showing these costumes are stored in the memory map 27a.

The electronic pet/agent 63 can make various motions. Motion 1 is standing, motion 2 is dancing, motion 3 is desk work, motion 4 is music-editing, motion 5 is talking with a travel agent over the telephone, motion 6 is data retrieval through the Internet, and so forth. The data items representing these motions are stored in the memory map 27a.

Thus, the agent can be dressed in a costume selected for the agent. The user of several agents may let the agents get together in an area provided in the server computer, and may then hold a costume contest for the agents dressed in different garments.

Of the data items stored in the memory map 27a and representing the basic appearances, one data item is selected to display the agent 63 as an electronic pet on the display screen. A particular basic appearance is selected for the agent 63. The basic appearance of the agent 63 can be changed to another when the user or the breeder operates the input device.

For example, the basic appearance of the agent 63 may be designated as "fish" in the community 67. If so, the user can change the basic appearance to "rabbit" when he or she buys the agent 63.

Of the data items stored in the memory map 27a, those indicating the motion, message and expression can be selected every time the agent 63 is displayed on the screen, so that the agent 63 may be displayed with features that agree to the conditions in which the agent 63 is displayed.

More precisely, the expression of the agent 63 is predetermined in accordance the message the agent 63 gives. For example, the agent 63 looks cheerful and moves positively when it gives a message "It is fine today." "Congratulations!" "You have won it." or "It is bright." Conversely, the agent 63 looks sad and moves passively when it gives a message "It is raining." "An accident has occurred." "I am embarrassed." or "I am scared." (If the message is an audio one given through a loudspeaker, it may be accompanied with music or an imitation sound. For example, a cheerful music accompanies the message "It is fine today." a melancholy music accompanies the message "I am scared." and the sound of rain accompanies the message "It is raining.")

If the user may accesses the community 67 at night, the agent 63 of the community 67 may appear in pajamas. If the user accesses the community 67 at three in the afternoon, the agent 63 may appear as if taking a break and may look relaxed.

The individual rule storage section 28 stores rules of operating the agent management system 3-1a, which are specific to the user. Among these rules are, for example, the frequency at which the electronic pet (agent 63) appears on the display screen, the frequency at which the pet asks the user questions, the number of characters that the agent management system 3-1a can display, the kinds of voices each character can utter, the types of characters (for example, a creature from outer space, an animal, a plant, a robot, or the like).

The individual rule storage section 28 stores data items that enable the user to use the agent management system 3-1a more easily. These data items include a data item that specifies whether each message of the electronic pet (agent 63) should be displayed in a bracket, a data item that designates the speed at which the message should be displayed, a data item that designates the language in which the message should be given, and a data item that determines whether the audio output should be stereophonic or monaural.

The attribute data storage section 29 stores a user profile that is the attribute information of the user. The user profile contains the birthday of the user, the family members of the user, the birthdays of the family members, the hobbies of them, and the life styles of them.

Other data stored in the attribute data storage section 29, in addition to the user profile, includes the answers to the questions the agent may ask. The other data also includes the data input in an input form, such as questionnaire, when the section 29 is connected to any given server computer 1-n by the communications network 2. A data-acquiring section 61-1a collects these data items input via the user computer 3-1. The data items collected are accumulated in the attribute data storage section 29. The amount of data accumulated in the attribute data storage section 29 may exceed a preset value. If so, the latest information is stored in the attribute data storage section 29, while deleting the old information that overflows the attribute data storage section 29.

Note that the user profile is scarcely updated. Therefore, the user may protect the user file so that the user profile would not be deleted.

The agent 63 utilizes these data items held in the attribute data storage section 29, as information that represents the user's taste. Namely, the agent 63 analyzes the information showing the user's taste, formulating key words and a dictionary. Based on the key words and the dictionary, the agent 63 autonomously collects information in the community 67, after it leaves for home at the first timing until it comes to work at the first timing.

The user profile may be registered in both individual rule storage section 28 and the attribute data storage section 29, at the initial setting, either at the time of installing the program or at the time of the first activation of the program. Other data terminals may be employed to inform a specific agent of the user's taste, the agent working on behalf of the user. In this case, the user profile can be registered in, for example, the attribute data storage section 29 when the agent is called to a new data terminal.

The key word storage section 30 stores two key words. The first key word is the fundamental data. The second key word has been generated by the data-analyzing section 61-1b that is incorporated in the agent management program

61-1. The key words may be classified into some categories. If so, they can be retrieved with higher efficiency than otherwise.

The acquired data storage section 60-2 stores information sources for the user. The information sources provide, for example, the questions to the user, the answers that may be given to the user in the course of conversation, small talks with the user, knowledge on daily life, and knowledge on various subjects. The information sources give data items. Of these data items, one may cause the electronic pet to appear autonomously on the computer screen, asking the user questions or gives advice "You should better do this to enjoy a cup of good tea." or displays a message "Today is the birthday of Mr. President." or a similar message, generated from the date information acquired from an environment data storage 35.

The acquired data storage section 60-2 stores other information. The other information has been collected by the data-acquiring section 61-1a of the agent management program 61-1 for the user, from the server computers 1-1 to 1-n.

That is, the acquired data storage section 60-2 stores the information supplied to the user computer 3-1. More precisely, the section 60-2 stores the information the agent 63 collects while staying in the community 67 (sever computer) and accessing the server computers 1-1 to 1-n, from the second timing when it leaves for home to the first timing when it comes to work. The acquired data storage section 60-2 stores the information the other agents have obtained, if any mobile agent or a stationed agent, other than the agent 63, exists in the user computer 3-1. Furthermore, the section 60-2 stores the information obtained by any other means.

Thus, the acquired data storage section 60-2 holds not only the information the agent 63 has acquired, but also the information any other agent has acquired and agents 63 employed in the user computer 3-1 have obtained. If a plurality of agents exist, the information each agent has acquired can be exchanged with another agent by way of the acquired data storage section 60-2.

The electronic-pet state storage section 32 stores the various states that the electronic pet (agent 63) assumes as time passes or as events take place. Of these states, the internal parameters of the electronic pet (agent 63), i.e., emotion, hanger, interest and the like (these parameters are not known to any other electronic pet), are stored in an internal state storage section 33.

In the electronic-pet state storage section 32, an external state storage section 34 stores the external parameters of the electronic pet (agent 63) (which are distinct from those of any other electronic pet), such as the position, orientation, color and the like. Further, an environment data storage section 35 stores the parameters of the physical environment of the electronic pet/agent 63 (for example, objects other than the pet (agent 63), weather, temperature, gravity, date and the like).

The information stored in the environment data storage section 35 is acquired from the contents of the server computers 1-1 to 1-n. The information represents weather data (rainy, fair, hot, cold, etc.), news (earthquake, great events, etc.), entertainment news (engagement of famous entertainers, release of musical works, etc.), and reports on the operating state of other electric apparatuses.

The electronic pet (agent 63) may appear on the computer screen and speaks, "I am hungry." based on the information stored in the internal state storage section 33. Alternatively, the electronic pet may give a message of "I am not in a good humor because it is raining today." "The power switch to the apparatus OO is still on." or the like.

Based on the information stored in the external state storage section 34, the electronic pet (agent 63) can appear in various costumes and attitudes. If the environment data storage section 35 provides the information that represents the message of "It is raining today." the electronic pet (agent 63) will appear in a raincoat and a bad mood on the display screen and will speak. This is because the internal state storage section 33 stores the information representing the message of "I am not in a good humor because it is raining today." The pet is thus displayed on the screen by using the data items stored in the common rule storage section 27, in accordance with the information that is stored in the internal state storage section 33.

The agent storage section 60-3 stores the agent 63 transmitted from the server computer 1-1 to the user computer 3-1 at the first timing.

Hence, the user computer 3-1 at which the agent works will execute the programs to process the agent 63 during the "working hours" when the agent 63 exists in the agent storage section 60-3.

Namely, during the working hours, the translation program, the retrieval program and the like are executed in accordance with the instructions input at the user's input device 38 or the instructions supplied from the CPU 11 of the user computer 3-1. If instructed to retrieve data or perform a transaction through the Internet, the agent will autonomously accesses the server computers 1-1 to 1-n via the communications network 2 to retrieve information or carry out the transaction.

During the off-duty hours, the agent 63 stays in the community 67 provided in the server computer. It performs various processes autonomously in the community 67. At this time, the agent 63 collects, by itself, data items that agree to the user's taste, on the basis of the information representing the user's taste and stored in the user computer during the working hours. The agent storage section 60-3 stores various mobile agents and various stationary agents.

The user uses the input device 38 to input information in order to execute the agent management program 61-1. Usually the user uses the input device 38 to input data into his computer. The input device 38 may be a keyboard, a mouse, a touch panel, a joystick, a data glove, or the like. Alternatively, it may be an external storage device such as an FD drive.

The picture-drawing system 36 stores data items that represent the outer appearance, motion and language of the electronic pet, i.e., a displayed figure of the agent 63. The picture-drawing system 36 receives a motion-indicating signal about the electronic pet/agent 63. This signal has been generated from the information stored in the knowledge database 26, by executing the agent management program 61-1. The system 36 generates electronic-pet image data that indicates the will and motion of the electronic pet (agent 63). The system 36 holds this electronic-pet image data for some time.

The data items representing the outer appearance, motion and language of the pet and stored in the picture-drawing system 36 may include data items representing the overall image, expression, costume, hand-leg motion and mouth motion of the electronic pet (agent 63), and a data item showing message boxes.

The audio-data generating system 37 stores audio data, which is one expression item of the agent 63. The audio-data generating system 37 receives a pet-motion signal that the agent management program 61-1 has generated from the information stored in the knowledge database 26. Based on the pet-motion signal the system 37 generates audio data that represents the will and motion of the electronic pet (agent 63). The audio data thus generated is temporarily stored in the audio-data generating system 37. The audio data includes various items, such as the voice pitch, talk speed and intonation of the electronic pet (agent 63).

The image and audio data items about the electronic pet (agent 63) are supplied, as output data, to the output device 39 such as a display or a loudspeaker. An application program may be installed in the HDD so that the automatic telephone dialing may be accomplished. If this is the case, the electronic pet (agent 63) can make a call to the user's mobile telephone and talk to the user through telephone.

The agent-data exchanging section 80 enables the agent 63 to exchange information any other mobile or stationary agent that exists in the community 67 or the server computers 1-1 to 1-n, or with any other mobile or stationary agent that exist in the user computer 3-1. The agent-data exchanging section 80 will be described below, with reference to the block diagram of FIG. 7.

Figure 7:
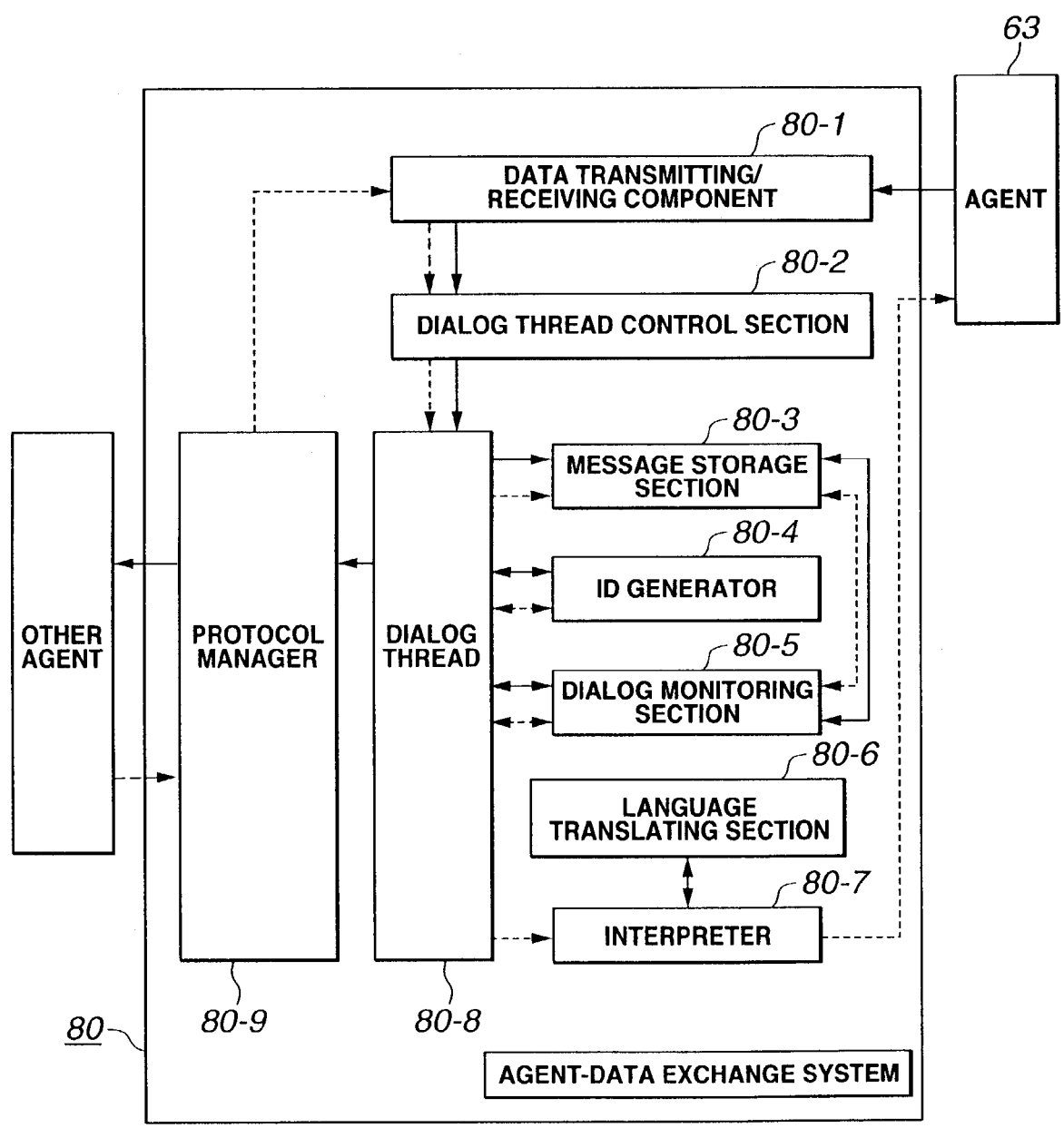
FIG. 7 is a block diagram illustrating the sequence of exchanging data between agents.

The agent-data exchanging section 80 shown in FIG. 7 is a system installed in the region where there exist agents, such as the server computers 1-1 to 1-n and the user computers 3-1 to 3-n. The section 80 serves to transfer information among the agents. The section 80 enables the agents to exchange information. In the user computer 3-1, the agent-data exchanging section 80 depicted in FIG. 7 is provided in the agent management program 61-1.

The agent 63 may be a mobile agent sent to the server computer or the user computer. Alternatively, it may be a stationary agent provided in the server computer or the user computer. The agent 63 transmits a message packet to another agent or receives a message package therefrom, through the agent-data exchanging section 80. Thus, the agent 63 can talk with the other agent.

The message packet has various contents. Among the contents are a data item showing the type of the message, the address of the message sender, the address of the message receiver, a dialog (question/answer) ID for linking a question with an answer, program-type data designating a translation program, a retrieval program, or the like for the agent, and the information to send or receive. Further, the contents include a software item that generates instructions from the message packet after the packet has moved to any other place.

In the agent-data exchanging section 80, the data transmitting/receiving component 80-1 can receive a message from the agent 63, an existing system or the network. The section 80 can also transmit a message to the agent 63, the existing system or the network.

The dialog thread control section 80-2 is a component that can control a dialog thread 80-8 that represents the dialog between the agent and the section 80, generate an appropriate thread from the dialog and control any dialog thread that has been already generated. The section 80-2 may be so configured as to enable the agent to talk with other agents in parallel asynchronous mode.

The message storage section 80-3 is a component that stores dialogs. The dialog monitoring section 80-5 is a component that performs policy check, thereby to determine whether a dialog can be achieved, from the message log stored in the message storage section 80-3 and the contents of the dialog undergoing at present.

A language translating section 80-6 is a component that translates, if necessary, the dialog into a dialog of another language. The interpreter 80-7 is a component that interprets any dialog to keep the dialog going.

How the components of the agent-data exchanging section 80 operate during any dialog will be described, with reference to the arrows indicated in solid lines in FIG. 7. First, the agent 63 sends a message packet to the agent-data exchanging section 80. Upon receiving the message packet, the agent-data exchanging section 80 determines whether the message packet is one that initiates a talk or one that receives a talk. If the message packet is one for initiating a talk, the dialog thread control section 80-2 is activated.

When activated, the dialog thread control section 80-2 determines whether a dialog thread has been generated, from the response ID that is contained in the message packet. If a dialog thread has been generated, the process goes to the dialog thread 80-8. If no dialog has been generated, a new dialog thread 80-8 is generated. In this case, the dialog thread control section 80-2 gives an instruction to an ID generator 80-4 via the dialog thread 80-8. Upon receiving the instruction the ID generator 80-4 generates a new dialog ID and assigns the same to the new dialog thread 80-8. Then, the process goes to the new dialog thread 80-8.

The message storage section 80-3 stores the message packet transmitted to the dialog thread 80-8.

The dialog monitoring section 80-5 receives the message packet. The section 80-5 then performs policy check to determine whether a dialog can be accomplished, from the dialog stored in the message log stored in the message storage section 80-3 and the contents of the dialog undergoing at present. If the section 80-5 finds that a dialog cannot be achieved, it determines that an error has occurred. If so, the dialog thread 80-8 processes the message packet and transmits a new message packet indicating the error.

If the section 80-5 finds that a dialog can be achieved, it transmits the message packet from the dialog thread 80-8 to the other agent (node) that has been designated by means of a protocol manager 80-9. The protocol manager 80-9 converts the message packet to a packet that accords with a protocol appropriate for the message receiver.

The message packet can be transmitted in various manners. It can be transmitted within the same community 67, in any one of the user computers 3-1 to 3-n, or to another computer via the network.

How the components of the agent-data exchanging section 80 operate at another character (node) that has received the message packet from the protocol manager 80-9 will be described, with reference to the arrows indicated in dotted lines in FIG. 7.

The data transmitting/receiving component 80-1, which has received the message packet from the protocol manager 80-9, determines whether the message packet is that initiates a talk or one that receives a talk. If the message packet is one for receiving a talk, the component 80-1 requests that the dialog thread control section 80-2 should process the message packet.

The dialog thread control section 80-2 refers to the response ID that is contained in the message packet. If a dialog thread has already been generated, the process goes to the dialog thread 80-8. If a new dialog has been generated, the section 80-2 generates a new dialog thread 80-8. The section 80-2 gives an instruction to the ID generator 80-4 via the dialog thread 80-8. The process therefore goes to the dialog thread 80-8.

The message storage section 80-3 stores the message packet transmitted to the dialog thread 80-8.

The dialog monitoring section 80-5 receives the message packet. The section 80-5 then performs policy check, determining whether a dialog can be carried out, from the dialog log stored in the message storage section 80-3 and the contents of the current dialog. If no dialog is possible, the section 80-5 determines that an error has been made. If this case, the section 80-5 processes the message packet in order to transmit a message packet showing the error.

If it is determined that a dialog can be carried out, the dialog thread 80-8 transfers the process to the interpreter 80-7. The interpreter 80-7 may be registered as one that corresponds to the language type, program type and the like of the message packet received. If so, the interpreter 80-7 is used to interpret the contents of the message packet. If the interpreter 80-7 is not registered as one that corresponds to the language type, program type and the like of the message packet received, it is determined whether the interpreter library includes an interpreter that the system can have access to.

If the interpreter library does not include such an interpreter, it is determined that no further process is possible. If in the interpreter library includes such an interpreter, the interpreter is registered as interpreter 80-7. The interpreter 80-7 thus registered interprets the contents of the message packet. The language translating section 80-6 translates the message packet, if necessary, to a message packet in another language.

The result of interpretation, obtained by the interpreter 80-7, is transmitted to the agent 63. The agent 63 performs a process that accords with the instruction described in the contents of the packet. The message received may, for example, demand the transmission of information. Then, the agent 63 transmits the information demanded. The dialog thread 80-8 waits for the next message packet.

Thus, the agent 63 can exchange information with not only the other mobile or stationary agents that exist in the community 67 and the server computers 1-1 to 1-n, but also the other mobile or stationary agents that exist in the user computer 3-1. Since information can be exchanged between the agents, a user of several agents may let the agents get together in an area provided in the server computer, and may then hold an expression contest for the agents that have different expressions.

The units with which the agent 63 may exchange information are not limited to other agents. Rather, the agent 63 can exchange information with, for example, the pet-state storage section 32 (not shown) provided in the user computer 3-1 and the data storage section incorporated in the knowledge database 26. Therefore, information can be exchanged such that a mobile agent stores information into the user computer 3-1 and any other agent can use the information stored in the user computer 3-1.

The system of exchanging of information between the agents is not limited to the one described above. The agents can exchange information by means of method calling (sub-routine call), (message passing), or the like.

The program relating to the agent employment system according to this embodiment will be explained. The program performs various processes, which are shown in FIGS. 8 to 13, in the server computer 1-1, thereby operating the agent system.

These programs are stored in a data recording medium such as an HDD, a CD-ROM, or the like. They are read from the data recording medium into a control device such as a CPU. The control device executes the programs, performing various processes.

Figure 8:
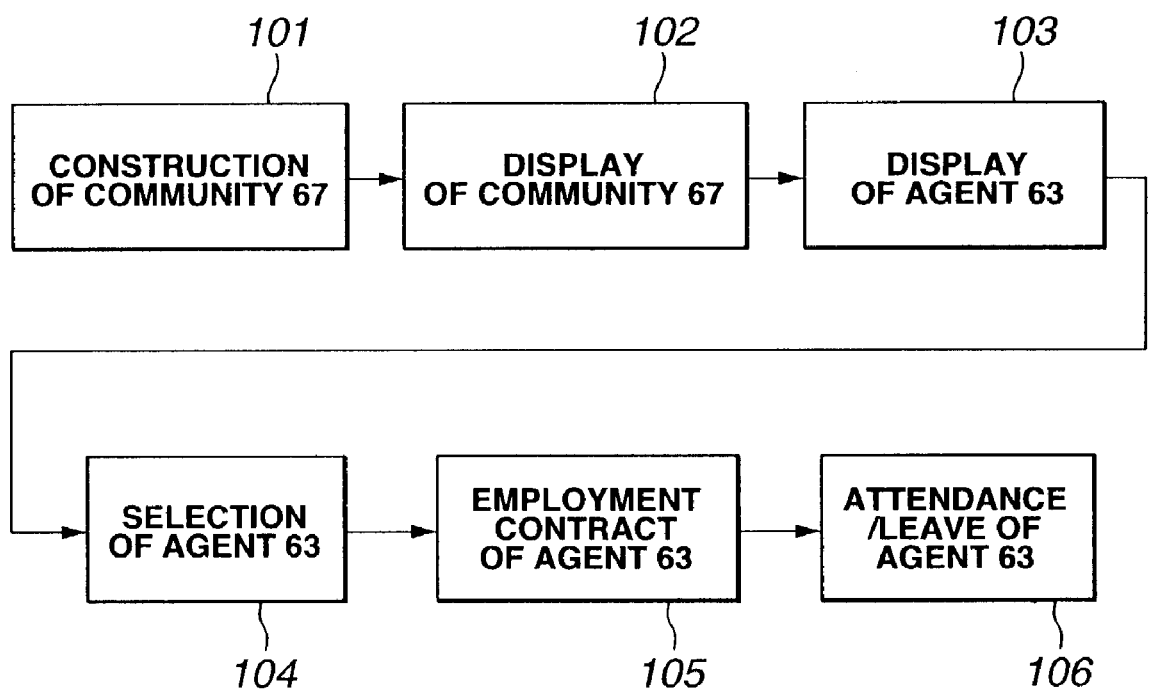
FIG. 8 is a diagram showing how a program is executed in the agent employment system.

How the agent employment program is executed in the agent employment system according to this embodiment will be outlined, with reference to FIG. 8. The agent employment program is executed in the agent employment program that comprises the server computer 1-1 and the user computer 3-1 used as a data terminal.

Figure 9:
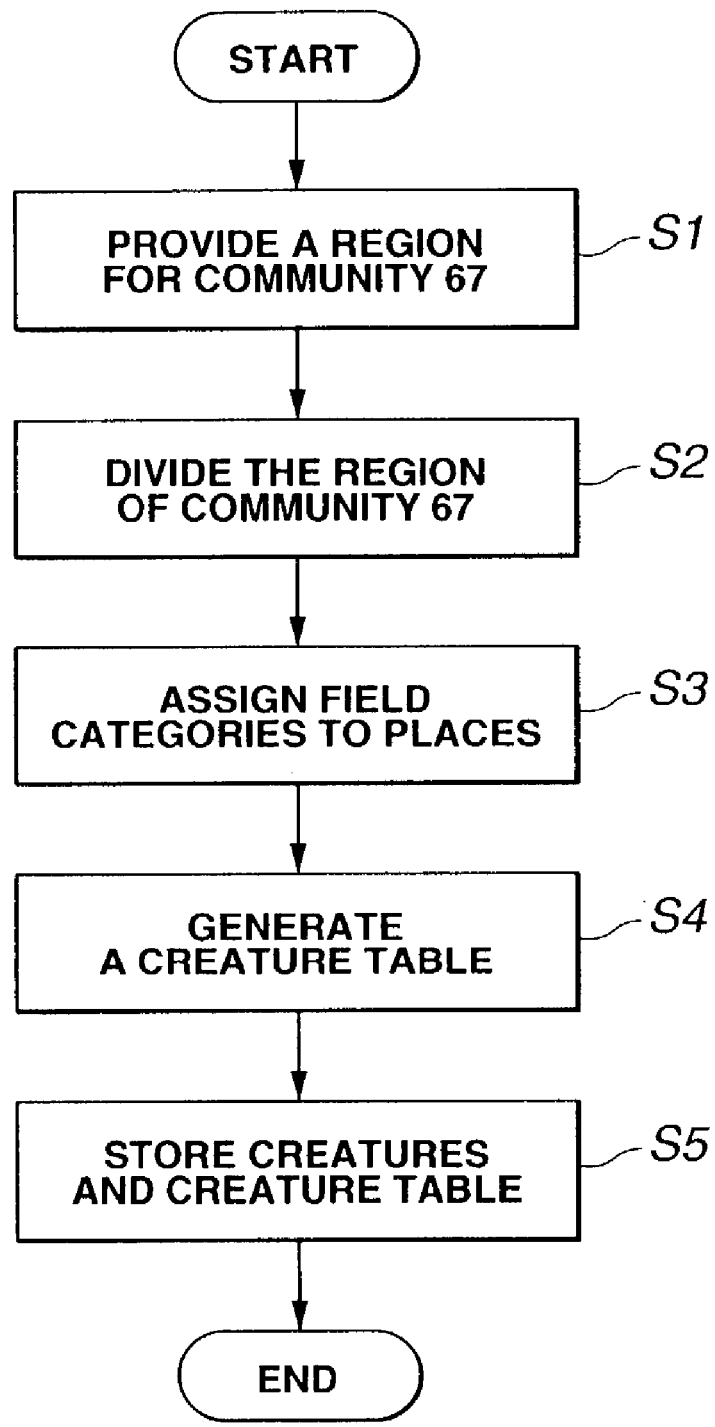
FIG. 9 is a flowchart explaining how a program is executed to form a community.

First, the community 67, which is a prescribed region when the agent 63 can exist, is constructed and recorded in the HDD of the server computer 1-1 (Process 101). This process shall be called "community-constructing program process (A)," which is illustrated in FIG. 9.

The community 67 may be constructed in only one server computer 1-1. Alternatively, it may be provided in a plurality of server computers 1-1 to 1-n and used as virtual spaces.

After the community 67 has been constructed, the community 67 is displayed on the screen (Process 102). In this process, the data representing the streets of the community 67 is generated. This data is stored in the data storage section 69 provided in the community 67.

Next, a community management program 69b is generated, which can display the image data that representing the streets of the community 67. The community management program 69b is stored into the data storage section 69 that is provided in the community 67. When Process 102 is carried out, it becomes possible to display the streets of the community 67 and the agent 63 and the creature 64, both acting in the streets of the community 67.

When the community 67 is displayed on the screen, the agent 63 is displayed in such a way that the user can select the agent 63 in the community 67 (Process 103).

More precisely, the contents, function and the like of the program for the agent 63 that can be employed are displayed in the form of a text-data list. Alternatively, the user may select the agent 63 by clicking the electronic pet, which is displayed in the streets of the community 67 and which corresponds to the agent 63.

In this process, format data is prepared to display the contents of the agent 63 that can be employed. The format data is stored into the data storage section 69 that is provided in the community 67.

Next, an agent extraction program is prepared to extract agents 63 that can be employed. The agent extraction program is stored into the creature storage section 69 of the community 67. The extraction program is generated when the salability column 117, the owner ID 120 and the like, all described in the creature table shown in FIG. 5, are retrieved. The agent extraction program is executed to extract the agents 63 that can be employed.

It is desired that the extraction program have various functions. These functions includes: the function of extracting all agents 63 for sale; the function of extracting any agent 63 in accordance with the program for processing the agent 63; and the function of extracting agents 63 that have similar appearances. Process 103 is performed, enabling the user to find and select an agent 63 that has a desirable program or a desirable appearance.

Thereafter, one of the agents 63 is designated in accordance with the user's instructions (Process 104). In this process, an agent 63 is identified when the user selects the agent 63.

The processes thus performed to employ an agent are carried out every time the user calls the agent to his or her data terminal. If the user has entered into an employment contract, however, the processes need not be performed.

Thereafter, an employment contract is concluded (Process 105). Process 105 is carried out by executing the program (B) of concluding an electronic pet/agent employment contract. The program (B) will be described later, with reference to FIGS. 10 and 11.

Then, the agent employed is made to come to work and leave for home (Process 106). Process 106 is performed by executing the program (D) of causing the agent to come to work and leave for home. The program (D) will be described later, with reference to FIG. 12. Thereafter, the programs are no longer executed in the agent employment system according to the present embodiment.

The program process (A) of constructing the community 67, which is related to Process 101, will be explained with reference to FIG. 9. In this process, a region for the community 67 is provided in the storage area of the server computer 1-1 (Step S1). The storage area is, for example, an HDD or the like.

The region for the community 67 is divided into places (addresses) from 65*a* to 65*w* (Step 2). Categories of fields, such as image-processing, translation and the like, are assigned to these places (Step S3). Each place is used as a group of data items of one field.

The creature table shown in FIG. 5 is generated (Step S4). The creature table contains data about creatures and data showing the relation between the creatures and the places.

The data storage section 69 is then constructed in the community 67. The creatures and the creature table are stored in the data storage section 69 (Step S5). Thereafter, the process is then terminated.

The information in the creature table is rewritten whenever necessary, whereby the creature table is updated. To store a new creature table into the community 67, for example, the data of the new creature table to the existing creature table. The creature table is thereby updated. The creature 64 may grow and developed into the agent 63. The creature 64 may be bought or sold, changing hands. In either case, the data will be updated.

Figure 10:
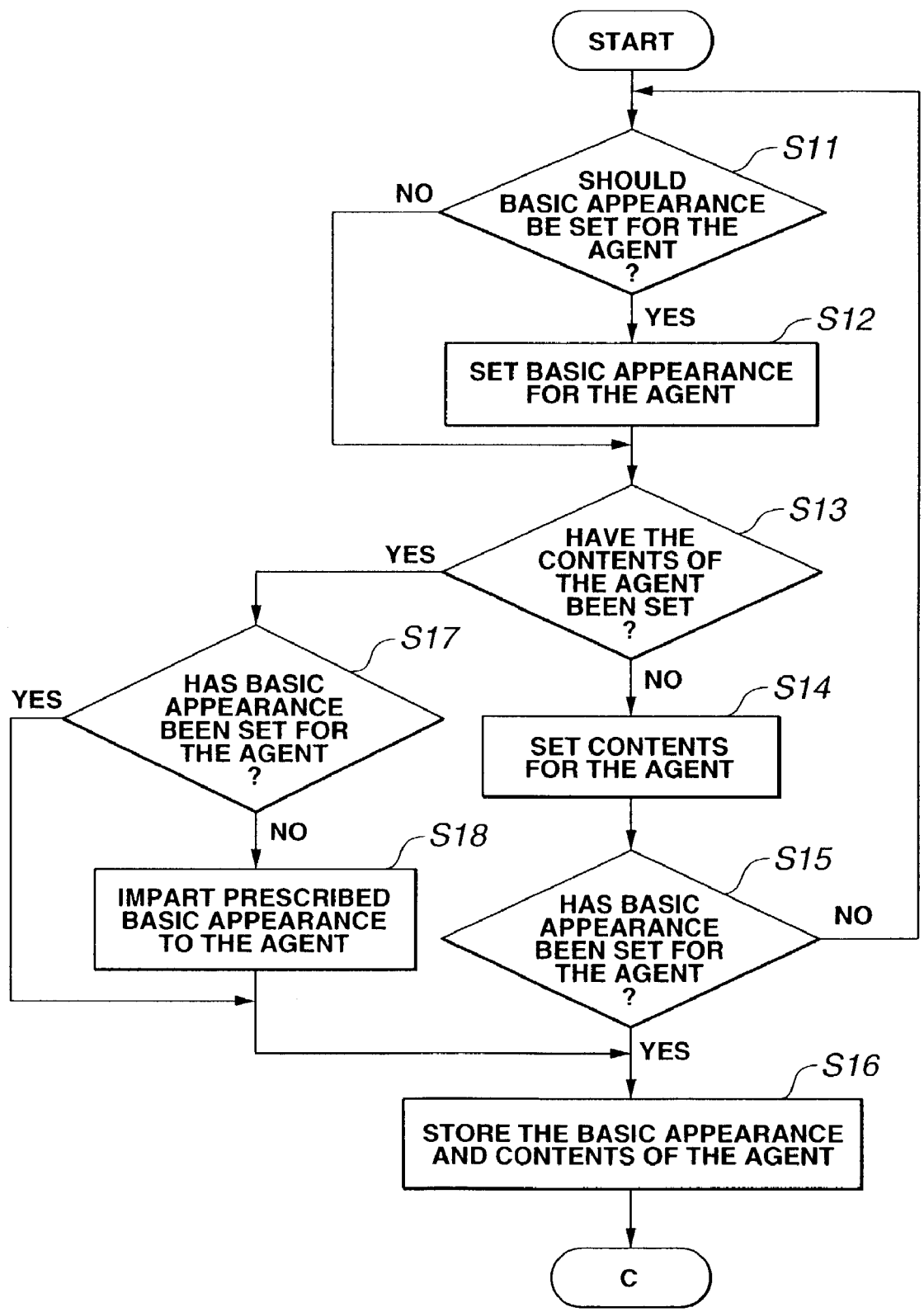
FIG. 10 is a part of a flowchart explaining how a program is executed to register an electronic pet/agent employment contract.
Figure 11:
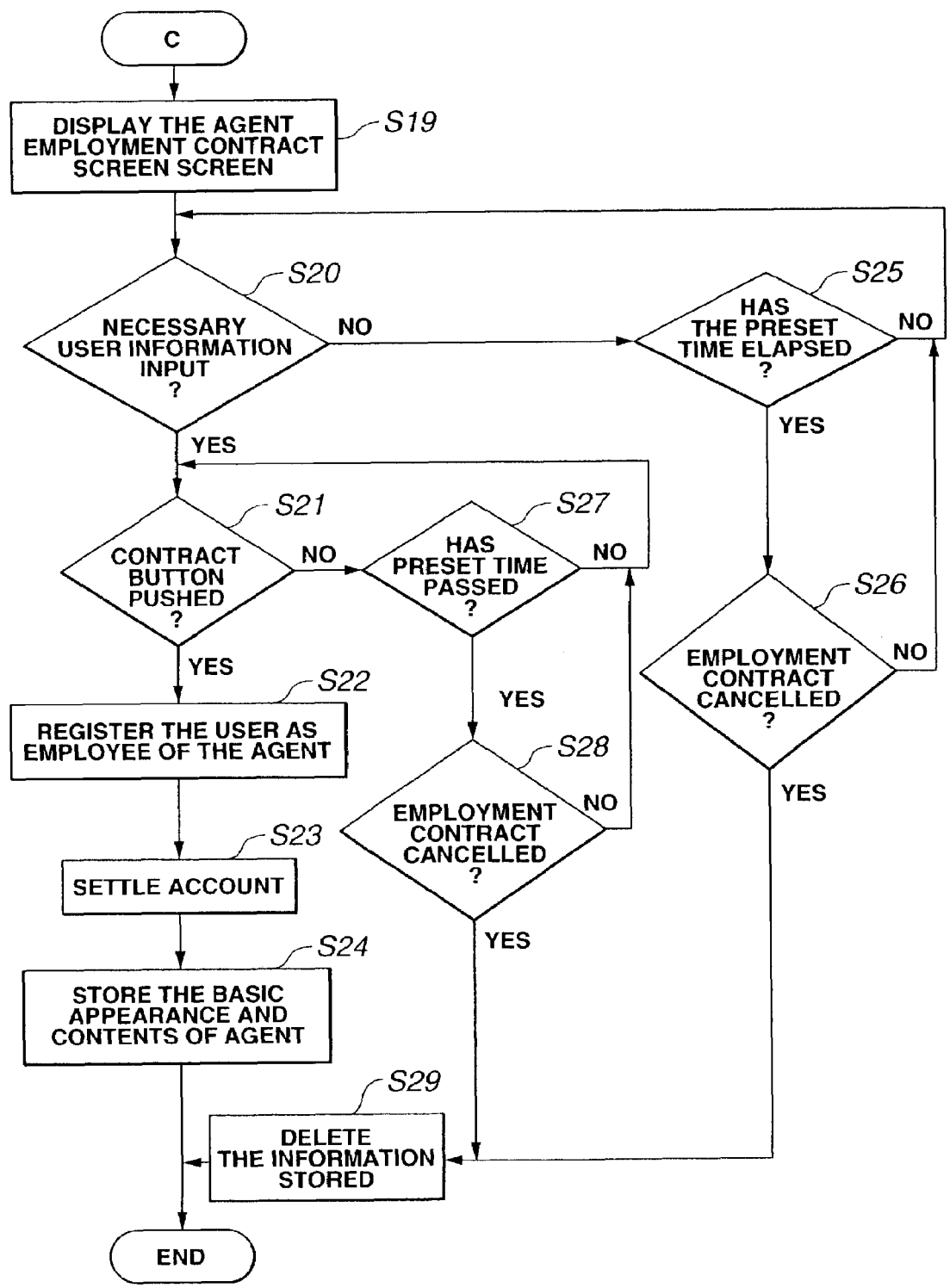
FIG. 11 is another part of the flowchart explaining how the program is executed to register the electronic pet/agent employment contract.

The program process (B) of registering the employer of an electronic pet/agent in the course of concluding a contract for employing the agent 63, which is related to Process 105, will be explained with reference to FIGS. 10 and 11. The community 67 contains a program for registering the agent employer. The program for registering the agent employer is executed to perform the following processes.

At first, it is determined whether a basic appearance should be set for the agent that has been designated in Process 104 described above (Step S11). If the user has input an instruction of setting a basic appearance for the agent 63 (that is, if Yes in Step S11), a basic appearance is set for the agent 63 (Step S12).

More specifically, an appearance-setting screen is displayed on the display, and the sets a basic appearance for the agent. The user may set either the basic appearance prescribed for the agent or a desirable basic appearance different from the prescribed one.

The agent 63 has the prescribed basic appearance at the time the user selects the agent 63 in the agent market 65*z*. In Step S12, the basic appearance of the agent 63 may be altered or not altered. Assume that the prescribed basic appearance is of "fish." Then, the basic appearance may remain "fish" or may be changed to "rabbit." After a basic appearance has been set for the agent, it is determined whether the contents of the agent have been set or not (Step S13).

If the user has not input an instruction of setting a basic appearance for the agent 63 (that is, if No in Step S11), it is determined whether the contents of the agent have been set (Step S13).

In Step S13 it may be determined that the contents of the agent have not been set. In this case, the process returns from Step 15 to Step S11. In Step S13 it may be determined that the contents of the agent have been set (that is, if Yes in Step S13). In this case, it is determined whether a basic appearance has been set for the agent (Step S17). If it is determined in Step S12 that a basic appearance has been set for the agent (that is, if Yes in Step S17), the basic appearance and contents of the agent are stored (Step S16).

In Step S17 it may be determined that no basic appearance has been set for the agent (that is, No in Step S17). In this case, it is considered that the user does not care for the basic appearance of the agent 63. Thus, the prescribed basic appearance is imparted to the agent 63 (Step S18). Then, the basic appearance and contents of the agent are stored (Step S16).

It may be determined that the contents of the agent have not been set (that is, if No in Step S13). If so, the contents of the agent are set (Step S14). The term "contents of the agent" means the execution speed, precision, language (Japanese, English, French, Chinese, etc.) and the like of the process program the agent 63 has and the retrieval key word of a retrieval program that the agent 63 may have. If the agent 63 has a plurality of process programs, the content of the agent include an item designates a specific program that should be executed prior to any other process programs.

The contents of the agent are set in the following manner. First, a screen for setting the contents of the agent 63 designated is displayed. Then, the user who wishes to buy the agent 63 sets desired contents for the agent 63 on the screen displayed.

Next, it is determined whether a basic appearance has been set for the agent (Step S15). If a basic appearance has been set for the agent 63 (that is, if Yes in Step S15), it is considered that the basic appearance and contents of the agent 63 have been set completely. In this case, the basic appearance and contents of the agent are stored (Step S16).

If a basic appearance has not been set for the agent 63 yet (that is, if No in Step S15), the process returns to Step S11. Thus, it is determined whether a basic appearance should be set for the agent (Step S11).

No basic appearance may be set for the agent 63 in Step S12. If this is the case, the process returns from Step S15 to Step S11. Hence, it is determined again whether a basic appearance should be set for the agent. If No in Step S11, the process goes to Step S13 to Step S17 and thence to Step S18. This is because the contents of the agent have been already set. The prescribed appearance is therefore imparted to the agent 63. The process goes from Step S16 to Step 19 that is shown in FIG. 11.

Figure 16:
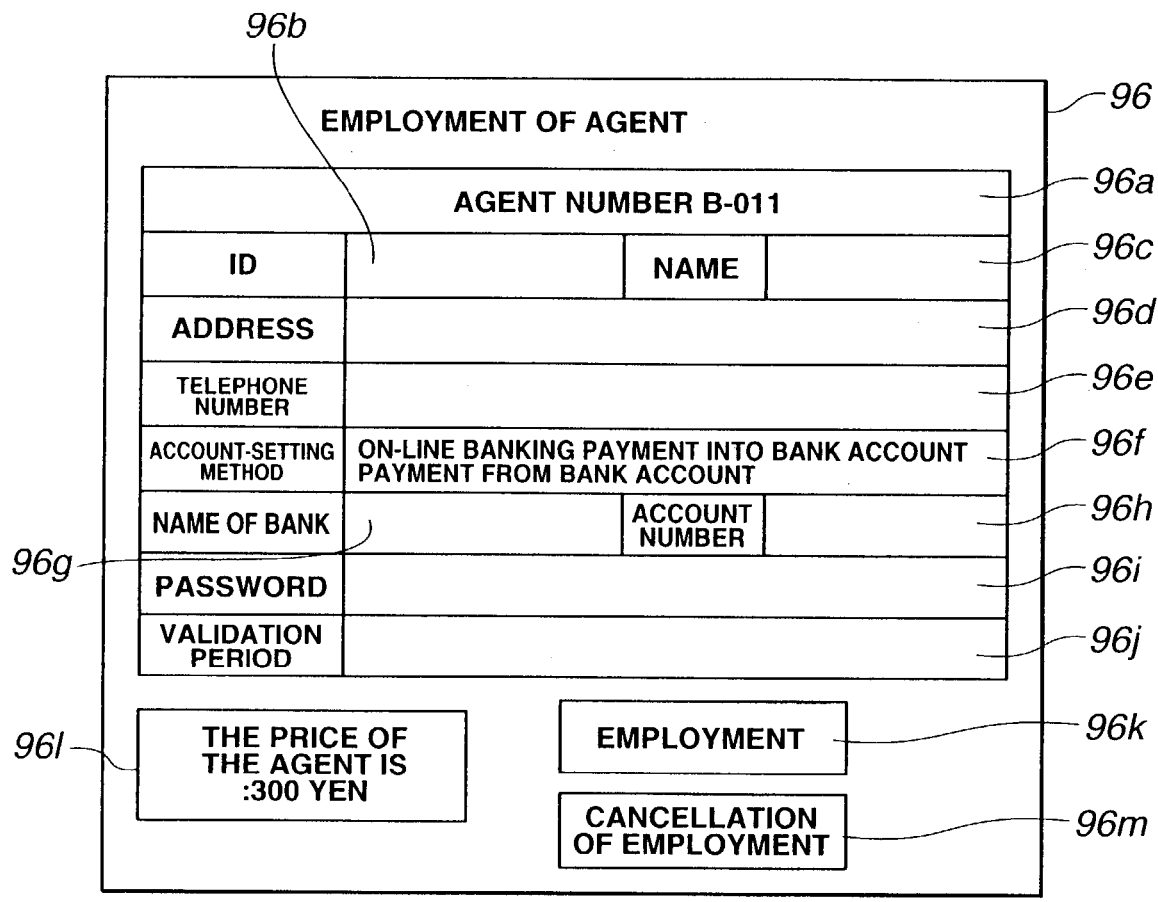
FIG. 16 is a diagram showing a screen for employing an agent.

After the basic appearance and contents of the agent have been stored, an agent employment contract screen shown in FIG. 16 is displayed (Step S19). It is determined whether the minimum user information required to conclude an agent employment contract has been input on the agent employment contract screen (Step S20). The minimum user information includes the user ID 96*b*, the account-settling method 96*f*, the bank name 96*g*, the account number 96*h*, and the password 96*i*. The agent purchase screen 96 has columns in which the name 96*c*, address 96*d*, telephone number 96*e* and the like of the user can be described. These columns are not absolutely necessary. In other words, the user's name, address, telephone number and the like can be processed even if they have been not input.

If the user information required has been input (that is, if Yes in Step S20), the process advances to Step S21. If the user information required has not been input (that is, if No in Step S20), it is determined whether a preset time, for example 15 minutes, has elapsed or not (Step S25).

If the preset time has passed (that is, if Yes in Step S25), it is determined whether the user has pushed a purchase-cancelling button 96*m*, thus cancelling the employment contract (Step S26). If it is determined that the user has cancelled the employment contract (that is, if Yes in Step S26), the information stored in Step S16 is deleted (Step S29). Then, the process is terminated.

It may not be determined that the user has not cancelled the employment contact (that is, if No in Step S26). In this case, the process returns to Step S20. In Step S20 it is determined again whether the necessary user information has been input. Thus, Steps S20 and S25 are repeated until it is determined that the employment contract has been cancelled.

If the preset time has not passed (that is, if No in Step S25), the process goes back to Step S20. In Step S20 it is determined whether the necessary user information has been input. That is, Steps S20 and S25 are repeated until the preset time has elapsed.

In Step S20 it may determined that the user information has been input, it is determined whether the user has pushed a purchase button 96k (Step S21). If the user has pushed the purchase button 96k (that is, Yes in Step S21), the process advances to Step S22. If the user has not pushed the purchase button 96k (that is, No in Step S21), it is determined whether a preset time, for example 15 minutes, has bee elapsed or not (Step S27).

If the preset time has passed (that is, if Yes in Step S27), it is determined whether the employment contract has been cancelled by, for example, detecting the depressing of the purchase-cancelling button 96m (Step S28). If it is determined that the employment contract has been cancelled (that is, if Yes in Step S28), the information stored in Step S16 is deleted (Step S29). Then, the process is terminated.

If it is not determined that the employment contract has not been cancelled (that is, if No in Step S28), the process returns to Step S21. In this case, it is determined whether the user has pushed an employment button (Step S21). Namely, Steps S21 and S28 are repeated until the user pushes the employment button or cancels the employment contract after the preset time has elapsed.

If the user pushes the employment button (that is, if Yes in Step S21), the user is registered as the employer of the agent (Step S22). Then, the account is settled by the method designated on the agent purchase screen (Step S23).

In the present embodiment, simultaneous settlement is effected by means of on-line baking. The money for the agent is paid into the seller's account at the same time the account is settled in Step S23.

Thereafter, the agent is transferred to the user (Step S24). The user can now use the agent. The process is then terminated.

On-line banking is carried out to achieve simultaneous settlement in this embodiment. Nonetheless, the account can be settled by the use of a credit card, by paying the money into the seller's bank account, or by transferring the money from the user's account to the seller's account.

It takes several days until the seller receives the money if the user pays it into or transferred it to the seller's account. In this case, the seller may transfer the agent after he or she receives the money. The money the user should pay may be calculated from the time the agent is kept at the user's data terminal. That is, it may be calculated from the period between the first timing and the second timing, which will be described later.

Figure 12:
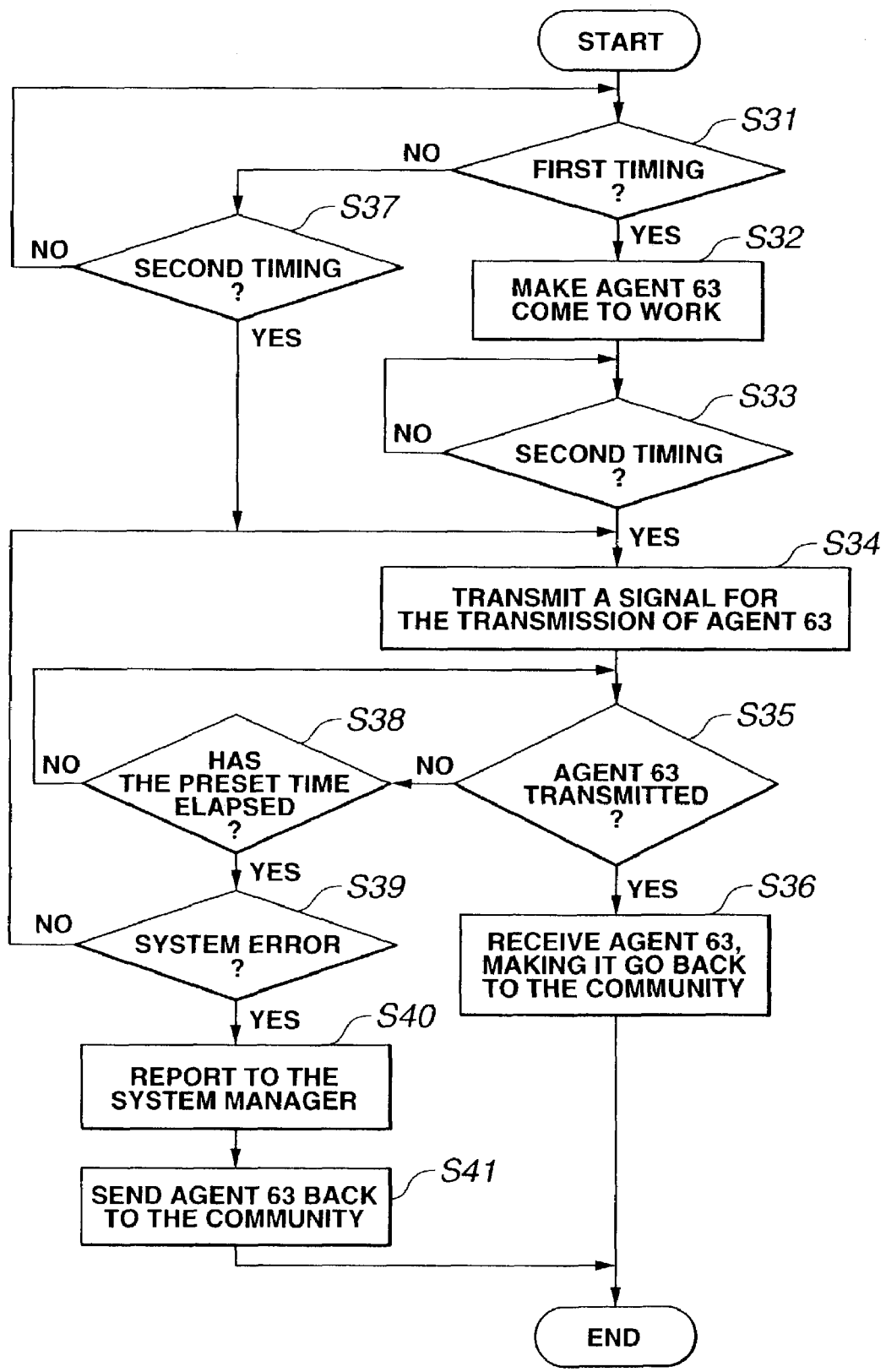
FIG. 12 is a flowchart explaining how it is recorded that an agent comes to work and leaves the work.

A process (D), which relates to Process 106 and in which the agent 63 employed in accordance with the employment contract concluded in Process 105 is made to come to work and leave for home, will be described with reference to FIG. 12. "Come to work." means that the agent is transmitted from the server computer to a data terminal. "Leave for home." means that the agent is transmitted from the data terminal back to the server computer.

At first, it is determined whether the first timing is reached when the agent 36 must come to work (Step S31). The first timing has been set by the user, as the time when the agent should come to work.

If the first timing is found to have been reached (that is, if Yes in Step S31), the process of making the agent 63 come to work (Step S32). This process is carried out as the agent-transmitting means provided in the server computer 1-1 copies the program for the agent 63, which is stored in the community 67, and transmits the copy 63b of the program to the user computer through the communications network 2. The data transmitted includes the 3D data about the agent, the content data thereof (text data, AV data and the like). It is desired that the software for displaying the agent at the data terminal be installed in the data terminal.

The server computer 1-1 stores the data of the source program 63a, which has been copied, in the community 67.

In the Step S31 the first timing may be found not to have been reached (that is, No in Step S31). In this case, it is determined whether the second timing has been reached (Step S37). The second timing has been set by the user, for example, when he or she enters into the employment contract. The second timing is the time when the agent may leave for home.

If the second timing is found to have been reached (that is, if Yes in Step S31), signal requesting for the transmission of the agent 63 is transmitted (Step S34). If the second timing is found not to have been reached (that is, if No in Step S31), the process returns to Step S31. Thus, if neither the first timing nor the second timing has been reached, Step S31 and Step S37 are repeated until the first timing or the second timing has come.

After the agent 63 is made to come to work, in Step S32, it is determined whether the second timing has been reached, at which the agent 63 may leave for home (Step S33). If the second timing is found to have been reached (that is, if Yes in Step S33), a signal requesting for the agent 63 is transmitted to the user computer 3-1 through the communications network 2 (Step S34). If the second timing is found not to have been reached (that is, if No in Step S33), the process returns to Step S33. Step S33 is repeated until the second timing is reached.

After the signal is transmitted, requesting for the agent, it is determined whether the agent 63 has been transmitted from the user computer 3-1 (Step S35). In other words, it is determined whether the user computer 3-1 has transmitted the agent 63 to the server computer 1-1 as is desired, upon receipt of the request signal from the server computer 1-1.

If the user computer 3-1 has transmitted the agent 63 (that is, Yes in Step S35). If so, it is assumed that the server computer 1-1 has transmitted the signal requesting for the agent 63, that the user computer 3-1 has received this signal, and that the user computer has transmitted the agent as is desired. In this case, the agent 36 is made to go back to the community (Step S36).

The process of making the agent 63 leave for home is performed in the following manner. First, the agent-receiving means, which is provided in the server computer 1-1, receives the agent 63c transmitted from the user computer 1-1 via the communications network 2.

The agent 63c is one to which the agent 63b (copy) that the user computer 3-1 received in Step S34 has changed after various processes have been performed in the user computer 3-1.

The agent program data 63c received in Step S36 is stored into the area of the community 67, in which the source agent program 63a is stored. At this time, the program 63c received may be written over the source agent program 63a. Alternatively, the source agent program 63a may be erased after it has been stored there for a prescribed period. Still alternatively, the agents 63a to 63c may be erased, except for the agent that has the latest time stamp. Thereafter, the process is terminated.

If the user computer 3-1 has not transmitted the agent 63 (that is, No in Step S35). If so, it is determined whether a preset time, for example 15 minutes, has been elapsed or not (Step S38). If the preset time has not passed (that is, if No in Step S38), it is determined whether the agent 63 has been transmitted (Step S35). In other words, Step S35 is repeated until the preset time elapses. If the preset time has passed (that is, if Yes in Step S38), it is it determined whether the system has made an error (Step S39).

If it is determined that the system has made an error (that is, if Yes in Step S39), the system manager is informed of the fact that the system has made an error (Step S40). This can be effected by various methods. One method is to display an error message on the display screen of the server computer 1-1. Another method is to cause the loudspeaker of the server computer 1-1 to generate an alarm or an error announcement. Another method is to transmit an error signal to the personal computer, mobile telephone, portable data terminal or the like that the user is using.

Thereafter, the agent 63 is sent back to the community (Step S41). To send the agent 63 back to the community, the following sequence of operations is carried out. First, the server computer 1-1 is connected to the user computer 3-1 by the communications network 2. Then, the agent program 63b is extracted from the agent storage section 60-3 and supplied to the server computer 1-1. The agent program 63b is identified with the source program 63a stored in the server computer 1-1 in Step S32.

The agent program 63b extracted from the section 60-3 is saved in the area in the community, in which the source agent program 63a is stored. The agent program 63b can be transmitted to the user computer 3-1 at the first timing, after the system error is corrected some time later.

When the agent is sent back to the community, the output device 39 of the user computer 1-1 displays a text message such as "Agent OO has been sent back here."

In the process of sending the agent back to the community, the data about the agent 63b may be copied, and the copy of this data may be transmitted to the sever computer 1-1. If this is the case, the source data about the agent 63b is saved in the user computer 3-1 and rendered not accessible. After the system error has been eliminated, the source data is made accessible at the first timing. The source data can be used to resume the operation of the agent employment system. After the agent 63 is sent back to the community, the process is terminated.

In Step S39 it may be determined that the system has not made an error (that is, if No in Step S39), a signal is transmitted to the user computer 3-1, requesting for the transmission of the agent 63 (Step S34). That is, unless the system makes an error, Steps S34, S35, S38 and S39 are repeated after the prescribed time is found, in Step S38, to have elapsed.

In this embodiment, the server computer transmits a "signal requesting for the transmission of the agent" to the user computer. This signal functions as a trigger to make the agent to go back to the server computer. Nonetheless, the agent may return to the server computer even if the server computer transmits no request signals. The agent can return to the server computer, for example, if the user selects the "you may come home" menu on the user computer or if the longest time the agent can stays in the user computer elapses.

Figure 13:
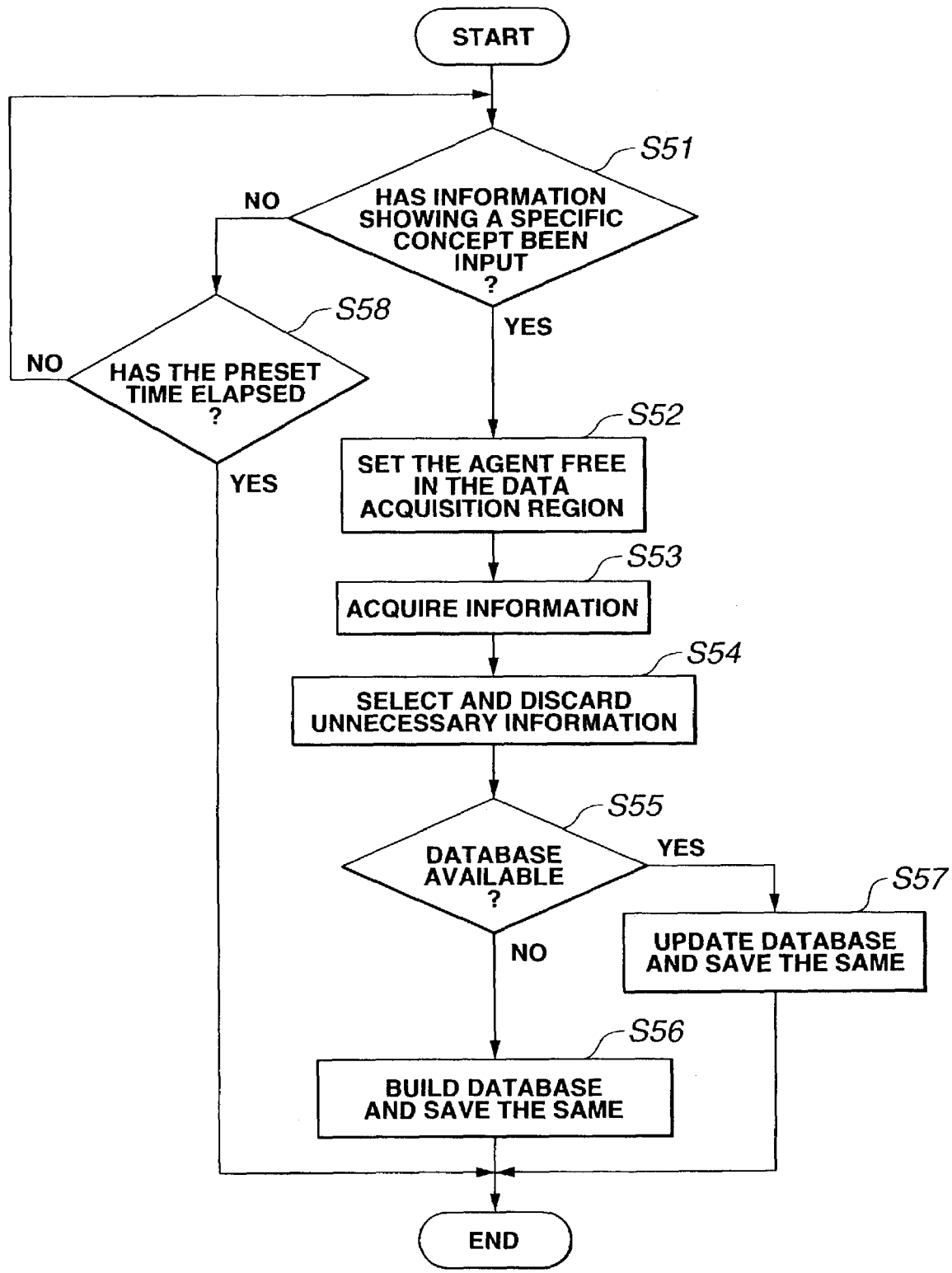
FIG. 13 is a flowchart explaining how an agent is bred.

An agent-breeding process (E) in which the breeder brings up an agent will be described, with reference to FIG. 13. Any agent stored in the community 67 has an agent-breeding program, which is executed to breed the agent. When the agent-breeding program is executed, the following process is carried out. The agent is brought up by setting it free in a data acquisition region defined by a specific concept, making the agent collect information about a specific field. The user can therefore acquire the agent more useful by using this agent-breeding process.

In the agent-breeding process, it is first determined whether the data representing specific concept has been input to define the data acquisition region (Step S51). This data is input when a keyword or the like is input at the input device of the computer of the breeder.

If the information showing the specific concept has been input (that is, if Yes in Step S51), the agent is let run loose in the data acquisition region defined by the specific concept (Step S52). The term "data acquisition region defined by the specific concept" means a set of sites that have been retrieved in accordance with the key word the breeder has input. In most cases this region covers a plurality of server computers 1-1 to 1-n. That is, the agent is set free in the region that corresponds to a set of sites.

The information showing the specific concept may not be input (that is, if No in Step S51). If so, it is determined whether a preset time, e.g., 15 minters, has elapsed (Step S58). If the preset time has not passed (that is, if No in Step S58), the process returns to Step S51. In other words, Step S51 is repeated until the preset time elapses. If the preset time has passed (that is, if Yes in Step S58), the process is automatically terminated.

After set free in the data acquisition region defined by the specific concept (Step S52), the agent autonomously acquires information in the data acquisition region (Step S53). Namely, the agent walks around in the server computers 1-1 to 1-n, autonomously collecting information in the region defined by the specific concept.

At this time, the agent generates a key word from not only the specific concept, such as a key word, supplied from the user in Step S51, but also the user information recorded in the user profile that is stored in the attribute data storage section 29. Using this key word, as well as the key word given at Step S51, the agent collects information. The agent can therefore acquire information more desirable to the user than the information it may have obtained by using only the key word given at Step S51.

Then, the agent selects unnecessary items from the information it has acquired. The unnecessary information items are discarded (Step S54). This makes it possible to build a compact database that contains necessary data items at a high ratio to unnecessary data items.

The agent selects unnecessary information items in accordance with not only the specific concept, such as the key word supplied from the user at Step S51, but also the key word generated from the user information stored in the attribute data storage section 29.

Thereafter, it is determined whether any database is available, which contains the information concerning the specific concept given in Step S31 (Step S55). If a database containing the information about the specific concept is available (that is, if Yes in Step S55), the information items acquired at Steps S53 and S34 are added to the database. The database is thereby updated and saved (Step S57). The process is then terminated.

If a database containing the information about the specific concept is not available (that is, if No in Step S55), the information items acquired at Steps S53 and S34 are accumulated, thus building a database and saving this database (Step S56). The process is then terminated.

Figure 14:
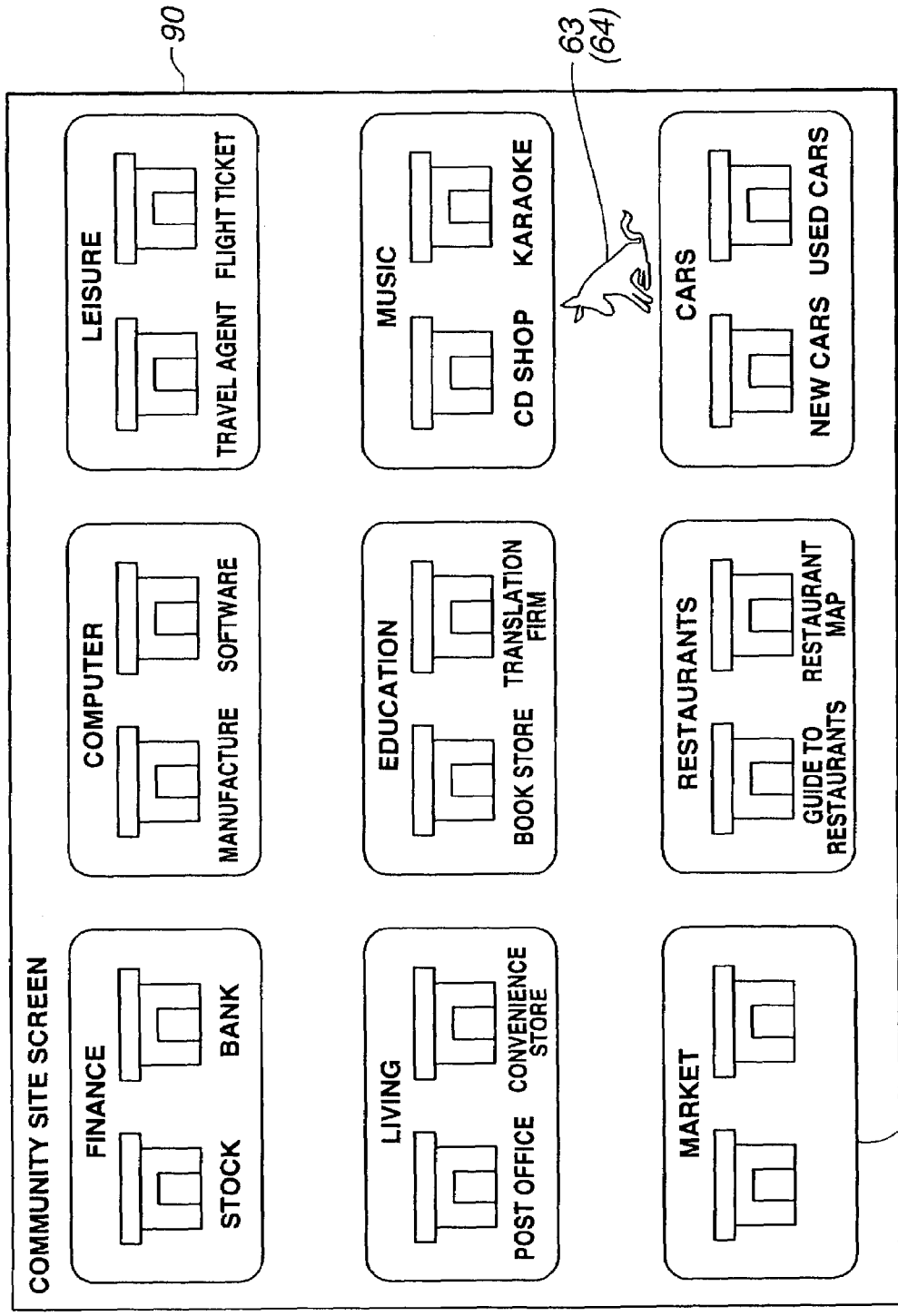
FIG. 14 is a diagram illustrating the screen of a community site.

How the agent employment system according to this embodiment operates will be described with reference to FIGS. 14 and 15. FIG. 14 illustrates the screen of a community site. FIG. 15 shows an agent introduction screen, which the user may use to purchase an agent 63 from the company that provides the electronic pet/agent employment system, thereby to transfer the property right concerning the agent 63, to the user.

The community 67 is divided into places 65, in which creatures 64 exist. The user accesses the server computer 1-1 from the user computer 3-1 through the communications network 2. The user can therefore see the creatures 64 displayed on the community side screen 90 of the server computer 1-1, which is shown in FIG. 14. On the community side screen 90, the community 67 is displayed as a town comprising some districts. The creatures 64 are displayed in the form of various characters. The user can see the creatures 64 displayed on the community side screen 90, some agents 63 talking with one another on the screen 90, and various events displayed on the screen 90.

The server computer 1-1 has an agent introduction page 95. The agent introduction page 95 shows the ID number 95a, program content 95b, characteristic 95c, appearance 95d and the data item indicating whether each agent is employed or not employed. On the agent introduction page 95 shown in FIG. 15, click buttons are displayed for the characteristic 95c and the appearance 95d. When the user clicks either button, the page is switched to a page that displays the characteristic or appearance in greater detail.

The user can access the agent introduction page 95 to select any agent 63 that he or she wishes to purchase. After selecting a desired agent 63, the user may click the purchase button 95e shown on the agent introduction page 95. In this case, an agent employment screen 96 shown in FIG. 16 is displayed, showing the monthly wage 961 of the agent. After confirming the wage 961, the user inputs the ID number 96b of the user computer 3-1, his or her personal data items 96c to 96e such as name, address, telephone number and the like, the account-settling method 96f, the password 96i, the validation period 96j and the like. Then, the user clicks the purchase button 96k, whereby the user concludes an agent employment contract. Thus, the employer of the agent, i.e., the user, is registered by the use of the agent purchase page 96. After the employer has been registered, the screen is switched back to the agent introduction page 95. At this time, the buttons selected change in color. When any button selected is clicked again, the item selected is displayed, whereby the user can confirm which agent he or she has employed. After confirming the agent employed, the user clicks a "next page" displayed on the agent introduction page 95.

The user pay the contract money specified in the agent employment contract, to the corporation, any organization or any individual that provides the agent employment system. The account may be settled by any method available, such as on-line banking, payment into bank account, payment from bank account, or the use of credit card, or the like.

The contract money may be fixed for each electronic pet/agent. Alternatively, the contract money may be determined in accordance with the ability of the agent, the number of clicks made for the agent, or the evaluation made by people. Still alternatively, the contract money may be determined at an auction held on a homepage. Further, it may be determined by the working hours of the agent.

After the employer of the agent has been registered, simultaneous settlement is effected by means of on-line banking. After paying the money to the holder (breeder) of the agent 63, the employer (contractor) can use the agent 63.

Figure 17:
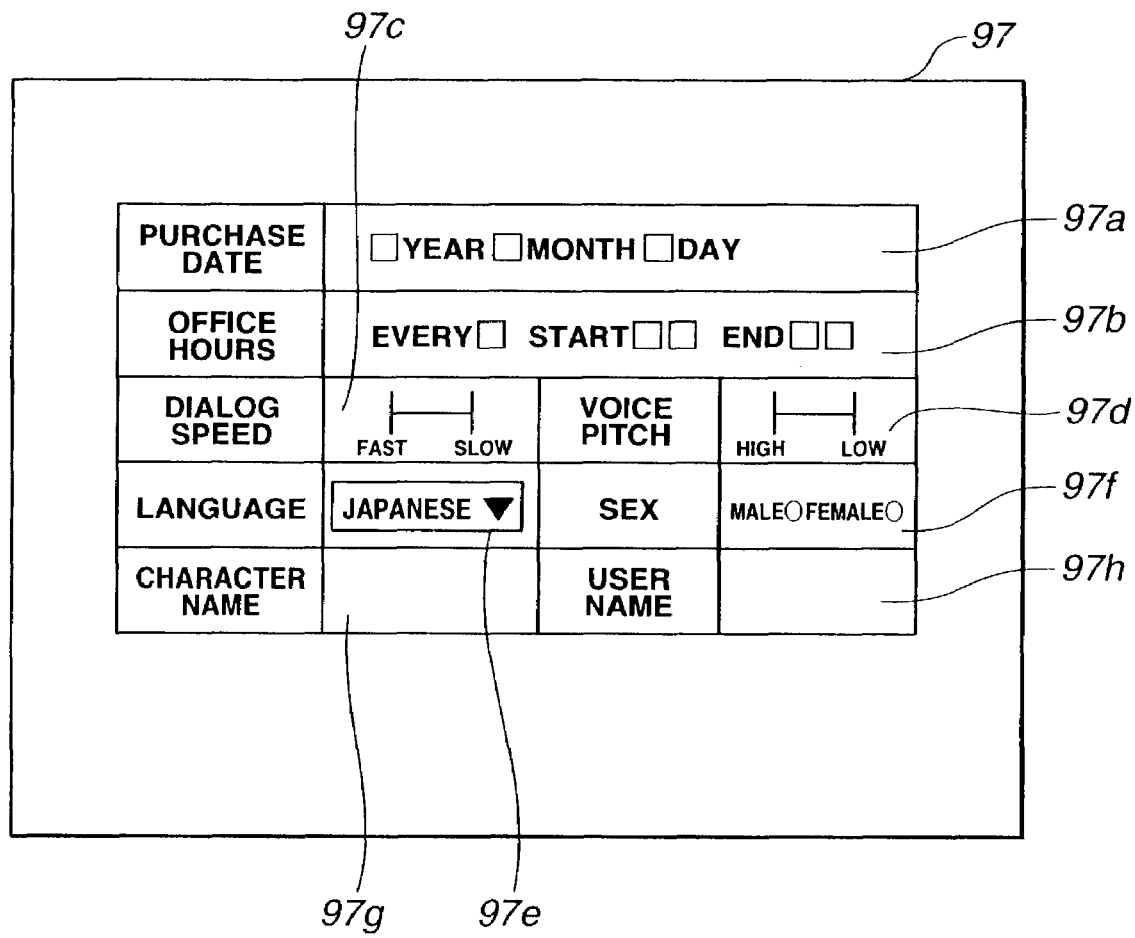
FIG. 17 is a diagram showing a screen for setting various features for an agent.

When the user clicks the "next page" button on the agent employment page 95, an agent setting page 97 shown in FIG. 17 is opened so that the initial setting can be performed.

In the initial setting, the user may input various data items. These data items include the starting data 97a of employment (year-month-day) and the working hours 97b (which months, which days, and which hours). The data items also include dialog speed 97c, voice pitch 97d, pull-down language menu 97e, sex selection box 97f, character-name input box 97g, user-name input box 97h, and the like. These data items are input to adjust the features of the agent 63 minutely. Note that the time when the agent must come to work corresponds to the above-mentioned first timing, and the time when the agent may leave for home corresponds to the above-mentioned second timing.

The user can access the agent setting page whenever desired, during the employment term specified in the agent employment contract. The values initially set can be changed whenever desired. Once the data items have been set, the agent 63 come to work in the user computer, automatically at the first timing.

The user may set 19:00 of a weekday to 8:00 of the following weekday as the working hours, and the next Monday as the work-starting day. In this case, the server computer 1-1 transmits the agent 63 to the agent storage section 60-3 of the user computer 3-1 through the communications network 2.

The working period may be several hours in a day, for example, from 9:00 to 17:00. The working period may be a long, such as several days on end, for example, from Friday to the next Monday. The working period may be longer, for example, several weeks or several months. Alternatively, the agent may work a few times a day. For example, it may first work from 8:00 to 9:00 and then from 18:00 to 20:00.

When the first timing, i.e., the time when the agent 63 should come to work, is reached, the server computer 1-1 transmits the agent 63 to the agent storage section 60-3 through the communications network 2. Hence, the agent 63 "comes to work."

When the agent 63 is stored into the agent storage section 60-3, the agent storage section 60-3 starts executing the program specific to the agent 63, causing the agent 63 to perform "its own business." The business of the agent depends on the program, which is executed based on the user's instruction input at the input device 38 or the instructions supplied from the CPU 11.

The agent 63 has a data-acquisition program and an analysis program, in addition to the program specific to it. The agent 63 acquires information from the acquired data storage section 60-2 and other data storage section (not shown) of the knowledge database 26, from the other stationary or mobile agent (not shown) of the user computer 3-1. The agent 63 analyzes the items of information acquired, thereby to determine the user's taste.

The agent 63 can therefore perform processes on the basis of the user's taste and in accordance with the instructions supplied from the user or the CPU 11. The program processes can be effected with high efficiency, also for the user.

Assume that the agent 63 has a translation program. Then, the agent 63 can translate any document the user has designated. The agent 63 obtains items of information from the acquired data storage section 60-2 and other data storage section (not shown) of the knowledge database 26. The agent 63 processes the information items, thereby generating key words and a dictionary of technical terms that are frequently used in the user's special field. Therefore, the user can translate the document with high efficiency.

When the second timing, the time when the agent 63 may leave for home, is reached, the agent 63 is transmitted back to the community 67 in the server computer 1-1, in accordance with the user's instructions or the command made by the agent management program 61-1. Thus, the agent "leaves for home."

In the community 67, which is the "home" of the agent 63, the agent 63 autonomously collects information that agrees to the user's taste represented by the data acquired in the user computer 1-1.

The agent 63 may analyze the user information, determining that the user is interested in cars. In this case, the agent 63 contacts the other agents having much information about the cars existing in the community 67 and acquires the information from the other agents. This acquisition of information is accomplished by using a keyword that indicates the user's taste and which the agent 63 has generated by using a key-word generating program. The agent 63 effects the program process in the community 67, assisted by the community management program 69b provided in the server computer 1-1.

Figure 18:
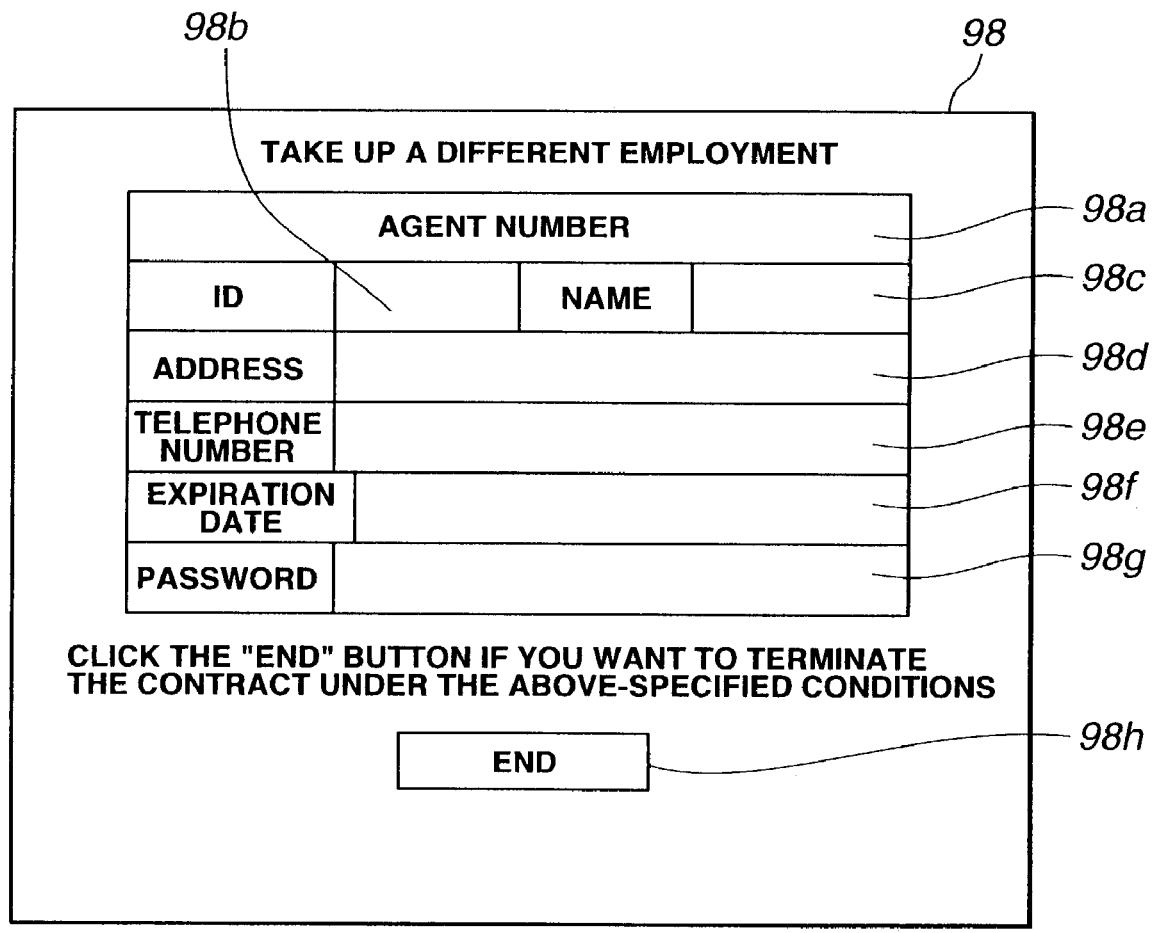
FIG. 18 is a diagram showing a screen for making an agent take up different employment.

The server computer 1-1 has a homepage shown in FIG. 18, which is used to make any agent take up different employment.

When the user finds it no longer necessary to employ the agent 63, he or she accesses the homepage shown in FIG. 18 to cancel the agent employment contract. The user input data items on the homepage shown in FIG. 18 to enable the agent 63 to change its job. The data items are the agent ID number 98a, the user ID number 98b, the user's personal data items 98c to 98e, such as the name, address, telephone number and the like, and the data items identifying the agent 63, such as the expiration date 98f of the contract, the password 98g and the like. After inputting these data items on the homepage shown in FIG. 18, the user clicks the cancel button 98h. The process of cancelling the agent employment contract is thereby completed. The agent 63, now unemployed, is displayed on the agent employment page 95 again. Thus, any other user may employ the agent 63.

As described above, the agent 63 works during the working hours, while collecting information about the user's taste, under the control of the user computer 3-1. During the off-duty hours, the agent 63 autonomously collects data in accordance with the information representing the user's taste, under the control of the server computer 1-1. Hence, the agent 63 can grow into a program that efficiently functions for the user.

Since the agent 63 is displayed as an electronic pet on the display screen, the user can enjoy utilizing the agent employment system.

Further, the user can selects one of the agents that have different characters. The user can therefore employ any agent he or she likes. Thus, the user can use an agent that performs a desired function, whenever he or she wants.

In the embodiment described above, the user can access the community 67, using the agent 63 as an intermediary. Instead, the user may acquire information from the community 67 (or may look into the community 67), by the use of any browser known. The various processes performed in the system include those that interfere with the community 67, such as enjoying shopping in the community 67 and participating in events in the community 67. In the agent employment system according to the invention, the user can take part in the community 67 or talk with any other user, through the agent 63 he or she has employed. Since the agent 63 is registered in the form of an ID number, the security of privacy is ensured. In addition, the owner of the server computers can secure a profit if he or she combine the agent 63 with a fee-charging means.

INDUSTRIAL APPLICABILITY

As has been described, in the information management system according to the invention, an agent usually staying in a server computer can be called to a user's data terminal and be made to perform a prescribed work in the data terminal. Thereafter, the agent may be sent back to the server computer. Therefore, user who has a plurality of devices can easily achieve information management, without performing complicated operations.

Since a network address is assigned to the agent, the user can send E-mails and the like to any other user, not caring about which data terminal the other user is now using or where the other user is using the data terminal.

In the information management system, agent employment system, information management method, agent employment method, data-providing apparatus and data-recording medium according to this invention, the user of a data terminal can make an agent perform processes as long as the agent exists in the user's data terminal. While the agent remains in a server computer, the agent autonomously collects information in accordance with the data which has acquired in the client terminal and which represents the user's taste. Hence, the agent can grow into one useful to the user, and the user can use it efficiently.

The agent has at least one of process programs, such as image-processing program, translation program, music-compressing program, dictionary-retrieving program, map-retrieving program, and game-processing program. Therefore, the agent can not only perform a plurality of processes, but also work in a specific field. This also renders the agent useful to the user.

Moreover, the agent has an electronic pet/agent displaying program that causes the display device to display the agent as an electronic pet. Hence, the user can enjoy using the agent that is useful to him or her.

The invention claimed is:

1. An information management system, comprising:
  at least one data terminal connected to a communications network and having a display device; and
  a server computer connected to said at least one data terminal over the communications network and having a region for storing an agent that has an independent network address which indicates the location of the agent within the communications network, said server computer including:
    transmitting means for transmitting at a first timing, if said server computer receives a transmission command initiated by a user, the agent together with first prescribed information from the server computer to one of said at least one data terminal from which the user requested the agent, and
    rewriting means for rewriting the first prescribed information into second prescribed information sent from the data terminal of the user;

said data terminal including:
  transmitting means for transmitting the agent and the second prescribed information to the server computer at a second timing;
wherein the first timing and the second timing are established before the agent is transmitted to the at least one data terminal, and over a time interval between the first timing and the second timing, said data terminal temporarily assumes the independent network address of the agent or said server computer temporarily replaces the independent network address of the agent with a network address assigned to the data terminal; and
wherein the agent has an agent displaying program for displaying the agent as an electronic pet, and the agent displaying program changes image-processing parameters according to types of the data terminal, the data terminal displaying the agent.

2. The information management system according to claim 1 wherein the first prescribed information is managed by the user of the agent stored in the region of the server computer, and the second prescribed information is generated when the user of the agent updates the first prescribed information.

3. The information management system according to claim 1, wherein the user of the agent uses only one agent that accords with information to be managed.

4. The information management system according to claim 3, wherein the agent is transmitted to only one of a plurality of data terminals of the user of the agent, not to any other data terminal at the same time.

5. The information management system according to claim 1, wherein the user of the agent updates the first prescribed infomation to the second prescribed information during a period between the first timing and the second timing.

6. The information management system according to claim 1, wherein the agent has a process program for performing at least one process selected from the group consisting of an image-processing process, translation process, a music-compressing process, a dictionary-retrieving process, a map-retrieving process, a game-processing process, an E-mailing process and a schedule-managing process.

7. An agent employment system, comprising:
  a data terminal connected to a communications network; and
  a server computer connected to said data terminal by the communications network and having a region for storing an agent that has an independent network address which indicates the location of the agent within the communications network, said server computer including:
    first agent-transmitting means for transmitting the agent to said data terminal at a first timing, said data terminal being that of a user who requested the agent;
  said data terminal including:
    agent-receiving means for receiving the agent transmitted from the server computer, and
    second agent-transmitting means for transmitting the agent to the server computer at a second timing;
  wherein the first timing and the second timing are established before the agent is transmitted to said data terminal, and over a time interval between the first timing and the second timing, said data terminal temporarily assumes the independent network address of the agent or said server computer temporarily replaces the independent network address of the agent with a network address assigned to said data terminal; and
  wherein the agent has an agent displaying program for displaying the agent as an electronic pet, and the agent displaying program changes image-processing parameters according to types of the data terminal, the data terminal displaying the agent.

8. The agent employment system according to claim 7, wherein the agent executes a program for autonomously performing processes during a period between the first timing and the second timing, in accordance with information representing a taste of a user who uses the agent.

9. The agent employment system according to claim 7, wherein the server computer has measuring means for measuring time during a period between the first timing and the second timing, and charging means for charging a fee in accordance with the time measured by the measuring means.

10. The agent employment system according to claim 7, wherein the agent has a process program for performing at least one process selected from the group consisting of an image-processing process, translation process, a music-compressing process, a dictionary-retrieving process, a map-retrieving process, a game-processing process, an E-mailing process and a schedule-managing process.

11. An information management method, comprising:
  transmitting, if a transmission command initiated by a user is received, an agent together with first prescribed information to a data terminal of a user that requested the agent, the agent having an independent network address which indicates the location of the agent within the communications network;
  transmitting the agent together with second prescribed information from the data terminal of the user to a server computer upon lapse of a prescribed time after the data terminal has received the agent, wherein a first timing at which the data terminal receives the agent and a second timing at which the prescribed time lapses are established before the agent is transmitted to the data terminal; and
  rewriting the first prescribed information to the second prescribed information at the server computer;
  wherein, over a time interval between the first timing and the second timing, said data terminal temporarily assumes the independent network address of the agent or said server computer temporarily replaces the independent network address of the agent with a network address assigned to said data terminal; and
  wherein the agent has an agent displaying program for displaying the agent as an electronic pet, and the agent displaying program changes image-processing parameters according to types of the data terminal, the data terminal displaying the agent.

12. The information management method according to claim 11, wherein the agent has a process program for performing at least one process selected from the group consisting of an image-processing process, translation process, a music-compressing process, a dictionary-retrieving process, a map-retrieving process, a game-processing process, an E-mailing process and a schedule-managing process.

13. The information management method according to claim 11, wherein the server computer measures time during a period between the first timing and the second timing, and charges a fee in accordance with the time measured by the measuring means.

14. An agent employment method, comprising:
- selecting an agent stored in a specific region of a computer, the selected agent having an independent network address which indicates the location of the agent within a communications network;
- transmitting at a first timing, if said server computer receives a transmission command initiated by a user, the selected agent together with first prescribed information to a data terminal of a user that requested the agent; and
- receiving, at a second timing, the selected agent together with second prescribed information;
- wherein the first timing and the second timing are established before the agent is transmitted to the data terminal, and over a time interval between the first timing and the second timing, the data terminal temporarily assumes the independent network address of the agent or the independent network address of the agent is temporarily replaced with a network address assigned to the data terminal; and
- wherein the agent has an agent displaying program for displaying the agent as an electronic pet, and the agent displaying program changes image-processing parameters according to types of the data terminal, the data terminal displaying the agent.

15. The agent employment method according to claim 14, wherein the agent has a process program for performing at least one process selected from the group consisting of an image-processing process, translation process, a music-compressing process, a dictionary-retrieving process, a map-retrieving process, a game-processing process, an E-mailing process and a schedule-managing process.

16. A server computer connected to a data terminal through a communications network and having a region for storing an agent, said sever computer comprising:
- transmitting means for transmitting, at a first timing if said server computer receives a transmission command initiated by a user, the agent together with first prescribed information to the data terminal of a user that requested the agent, the agent having an independent network address which indicates the location of the agent within the communications network;
- receiving means for receiving the agent, at a second timing, together with second prescribed information, wherein the first timing and the second timing are established before the agent is transmitted to the data terminal; and
- rewriting means for rewriting the first prescribed information to the second prescribed information;
- wherein, over a time interval between the first timing and the second timing, the data terminal temporarily assumes the independent network address of the agent or said server computer temporarily replaces the independent network address of the agent with a network address assigned to the data terminal; and
- wherein the agent has an agent displaying program for displaying the agent as an electronic pet, and the agent displaying program changes image-processing parameters according to types of the data terminal, the data terminal displaying the agent.

17. The server computer according to claim 16, wherein the agent executes a program for autonomously performing processes during a period between the first timing and the second timing, in accordance with information representing a taste of a user who uses the agent.

18. The server computer according to claim 16, wherein the agent has a process program for performing at least one process selected from the group consisting of an image-processing process, translation process, a music-compressing process, a dictionary-retrieving process, a map-retrieving process, a game-processing process, an E-mailing process and a schedule-managing process.

19. A data terminal connected to a communications network and having a display device, said data terminal comprising:
- receiving means for receiving at a first timing, if said server computer receives a transmission command initiated by a user that requested the agent, an agent together with first prescribed information from a server computer, the agent having an independent network address which indicates the location of the agent within the communications network; and
- transmitting means for transmitting the agent together with second prescribed information to the server computer at a second timing;
- wherein the first timing and the second timing are established before the agent is transmitted from the server computer and received at the data terminal, and over a time interval between the first timing and the second timing, said data terminal temporarily assumes the independent network address of the agent or the server computer temporarily replaces the independent network address of the agent with a network address assigned to the data terminal; and
- wherein the agent has an agent displaying program for displaying the agent as an electronic pet, and the agent displaying program changes image-processing parameters according to types of the data terminal, the data terminal displaying the agent.

20. The data terminal according to claim 19, wherein the agent executes a program for autonomously performing processes during a period between the first timing and the second timing, in accordance with information representing a taste of a user who uses the agent.

21. The data terminal according to claim 19, wherein the agent has a process program for performing at least one process selected from the group consisting of an image-processing process, translation process, a music-compressing process, a dictionary-retrieving process, a map-retrieving process, a game-processing process, an E-mailing process and a schedule-managing process.

22. A data recording medium having computer executable instructions stored therein for performing an agent employment method, said method comprising:
- selecting an agent stored in a specific region of a computer, the selected agent having an independent network address which indicates the location of the agent within a communidations network;
- transmitting, at a first timing, the selected agent together with first prescribed information to a data terminal of a user that requested the agent;
- receiving the agent together with second prescribed information at a second timing, wherein the first timing and the second timing are established before the agent is transmitted to the data terminal; and
- rewriting the first prescribed information into the second prescribed information;
- wherein, over a time interval between the first timing and the second timing, the data terminal temporarily assumes the independent network address of the agent or the independent network address of the agent is temporarily replaced with a network address assigned to the data terminal; and wherein the agent has an agent displaying program for displaying the agent as an electronic pet, and the agent displaying program changes image-processing parameters according to types of the data terminal, the data terminal displaying the agent.

23. A data recording medium having computer executable instructions for performing an information management method, said method comprising:

receiving, at a first timing, an agent together with first prescribed information from a server computer at a data terminal of a user that reguested the agent, the agent having an independent network address which indicates the location of the agent within a communications network; and transmitting the agent together with second prescribed information to the server computer at a second timing;

wherein the first timing and the second timing are established before the agent is transmitted to the data terminal, and over a time interval between the first timing and the second timing, the independent network address of the agent is temporarily assumed or the server computer temporarily replaces the independent network address of the agent with a network address assigned to a data terminal; and wherein the agent has an agent displaying program for displaying the agent as an electronic pet, and the agent displaying program changes image-processing parameters according to types of the data terminal, the data terminal displaying the agent.

24. A data recording medium having computer executable instructions for performing for performing an information management method, said method comprising:

connecting a specific data terminal to a server computer;

requesting that the server computer transmit an agent to the specific data terminal, the agent having an independent network address which indicates the location of the agent within the communications network;

receiving the agent at the specific data terminal at a first timing; and transmitting the agent from the specific data terminal to the server computer at a second timing;

wherein the first timing and the second timing are established before the agent is transmitted to the specific data terminal, and over a time interval between the first timing and the second tirdng, the specific data terminal temporarily assumes the independent network address of the agent or the server computer temporarily replaces the independent network address of the agent with a network address assigned to the specific data terminal; and wherein the agent has an agent displaying program for displaying the agent as an electronic pet, and the agent displaying program changes image-processing parameters according to types of the data terminal, the data terminal displaying the agent.

25. The data recording medium according to claim 22, wherein the agent includes a process program for performing at least one process selected from the group consisting of an image-processing process, translation process, a music-compressing process, a dictionary-retrieving process, a map-retrieving process, a game-processing process, an E-mailing process, and a schedule-managing process.

26. The data recording medium according to claim 23, wherein the agent includes a process program for performing at least one process selected from the group consisting of an image-processing process, translation process, a music-compressing process, a dictionary-retrieving process, a map-retrieving process, a game-processing process, an E-mailing process, and a schedule-managing process.

27. The data recording medium according to claim 24, wherein the agent includes a process program for performing at least one process selected from the group consisting of an image-processing process, translation process, a music-compressing process, a dictionary-retrieving process, a map-retrieving process, a game-processing process, an E-mailing process, and a schedule-managing process.

* * * * *